(12) United States Patent
Jenkins et al.

(10) Patent No.: US 9,037,696 B2
(45) Date of Patent: May 19, 2015

(54) MANAGING INFORMATION ASSOCIATED WITH NETWORK RESOURCES

(75) Inventors: Jonathan A. Jenkins, Seattle, WA (US); Brett R. Taylor, Bainbridge Island, WA (US); Gregory M. Hart, Mercer Island, WA (US); Jeffrey P. Bezos, Greater Seattle Area, WA (US)

(73) Assignee: Amazon Technologies, Inc., Seattle, WA (US)

( * ) Notice: Subject to any disclaimer, the term of this patent is extended or adjusted under 35 U.S.C. 154(b) by 448 days.

(21) Appl. No.: 13/211,188

(22) Filed: Aug. 16, 2011

(65) Prior Publication Data

US 2013/0046869 A1    Feb. 21, 2013

(51) Int. Cl.
  *G06F 15/173*    (2006.01)
  *H04L 29/08*    (2006.01)
  *G06F 17/30*    (2006.01)

(52) U.S. Cl.
  CPC .......... *H04L 67/22* (2013.01); *G06F 17/30864* (2013.01)

(58) Field of Classification Search
  CPC ....... H04L 67/02; H04L 67/142; H04L 67/22; G06F 17/30864; G06F 17/30899; G06F 17/30861; G06F 15/173
  USPC .................................. 709/223, 220, 217, 224
  See application file for complete search history.

(56) References Cited

U.S. PATENT DOCUMENTS

| | | |
|---|---|---|
| 5,634,064 A | 5/1997 | Warnock et al. |
| 5,872,850 A | 2/1999 | Klein et al. |
| 5,961,593 A | 10/1999 | Gabber et al. |
| 6,049,812 A | 4/2000 | Bertram et al. |
| 6,108,637 A | 8/2000 | Blumenau |
| 6,138,156 A | 10/2000 | Fletcher et al. |
| 6,195,679 B1 | 2/2001 | Bauersfeld et al. |
| 6,430,624 B1 | 8/2002 | Jamtgaard et al. |
| 6,549,941 B1 | 4/2003 | Jaquith et al. |
| 6,560,620 B1 | 5/2003 | Ching |
| 6,625,624 B1 | 9/2003 | Chen et al. |

(Continued)

FOREIGN PATENT DOCUMENTS

WO    WO 2013/003631 A2    1/2013

OTHER PUBLICATIONS

Rao, H.C.-H., et al., "A Proxy-Based Personal Web Archiving Service," Operating Systems Review, 35(1):61-72, 2001.

(Continued)

*Primary Examiner* — Wing F Chan
*Assistant Examiner* — Benjamin M Thieu
(74) *Attorney, Agent, or Firm* — Knobbe, Martens, Olson & Bear, LLP

(57) ABSTRACT

Systems, methods and interfaces for the selective management of information collected by a browser are provided. The browser obtains a network resource, such as a Web page, from a content provider, and collects information associated with the display and interaction with the content by a user. The browser presents, among other controls, a graphical icon that is representative of an integrated command to remove information collected while accessing a first network resource and to cause the browser application to access a second accessed network resource. Upon receipt of an input corresponding to the selection of the graphical icon, the browser deletes information collected while accessing the first network resource and accesses the second network resource.

31 Claims, 19 Drawing Sheets

(56) References Cited

U.S. PATENT DOCUMENTS

| | | | |
|---|---|---|---|
| 6,633,316 B1 * | 10/2003 | Maddalozzo et al. | 715/854 |
| 6,704,024 B2 | 3/2004 | Robotham et al. | |
| 6,725,269 B1 * | 4/2004 | Megiddo | 709/228 |
| 6,785,864 B1 | 8/2004 | Te et al. | |
| 6,871,236 B2 | 3/2005 | Fishman et al. | |
| 6,944,665 B2 | 9/2005 | Brown et al. | |
| 6,963,850 B1 | 11/2005 | Bezos et al. | |
| 7,003,442 B1 | 2/2006 | Tsuda | |
| 7,051,084 B1 | 5/2006 | Hayton et al. | |
| 7,054,952 B1 | 5/2006 | Schwerdtfeger et al. | |
| 7,085,736 B2 | 8/2006 | Keezer et al. | |
| 7,159,023 B2 | 1/2007 | Tufts | |
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,373,313 B1 | 5/2008 | Kahle et al. | |
| 7,543,059 B2 | 6/2009 | Johnson et al. | |
| 7,565,425 B2 * | 7/2009 | Van Vleet et al. | 709/224 |
| 7,792,944 B2 | 9/2010 | DeSantis et al. | |
| 7,831,582 B1 | 11/2010 | Scofield et al. | |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,060,463 B1 | 11/2011 | Spiegel | |
| 8,073,850 B1 | 12/2011 | Hubbard et al. | |
| 8,103,742 B1 | 1/2012 | Green | |
| 8,185,621 B2 | 5/2012 | Kasha | |
| 8,249,904 B1 | 8/2012 | DeSantis et al. | |
| 8,271,887 B2 | 9/2012 | Offer et al. | |
| 8,316,124 B1 | 11/2012 | Baumback et al. | |
| 8,336,049 B2 | 12/2012 | Medovich | |
| 2001/0039490 A1 | 11/2001 | Verbitsky et al. | |
| 2002/0030703 A1 | 3/2002 | Robertson et al. | |
| 2002/0194302 A1 | 12/2002 | Blumberg | |
| 2003/0023712 A1 | 1/2003 | Zhao et al. | |
| 2003/0041106 A1 | 2/2003 | Tuli | |
| 2003/0084121 A1 * | 5/2003 | De Boor et al. | 709/218 |
| 2003/0137531 A1 * | 7/2003 | Katinsky et al. | 345/716 |
| 2004/0073713 A1 * | 4/2004 | Pentikainen et al. | 709/249 |
| 2004/0083294 A1 | 4/2004 | Lewis | |
| 2004/0093376 A1 * | 5/2004 | De Boor et al. | 709/203 |
| 2004/0139208 A1 | 7/2004 | Tuli | |
| 2004/0181613 A1 | 9/2004 | Hashimoto et al. | |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2005/0010863 A1 | 1/2005 | Zernik | |
| 2005/0060643 A1 | 3/2005 | Glass et al. | |
| 2005/0138382 A1 | 6/2005 | Hougaard et al. | |
| 2005/0183039 A1 | 8/2005 | Revis | |
| 2005/0246193 A1 | 11/2005 | Roever et al. | |
| 2006/0085766 A1 | 4/2006 | Dominowska et al. | |
| 2006/0095336 A1 | 5/2006 | Heckerman et al. | |
| 2006/0122889 A1 | 6/2006 | Burdick et al. | |
| 2006/0168510 A1 | 7/2006 | Bryar et al. | |
| 2006/0184421 A1 | 8/2006 | Lipsky et al. | |
| 2006/0248442 A1 | 11/2006 | Rosenstein et al. | |
| 2006/0277167 A1 | 12/2006 | Gross et al. | |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0094241 A1 | 4/2007 | Blackwell et al. | |
| 2007/0124693 A1 | 5/2007 | Dominowska et al. | |
| 2007/0139430 A1 | 6/2007 | Korn et al. | |
| 2007/0240160 A1 | 10/2007 | Paterson-Jones et al. | |
| 2007/0288589 A1 | 12/2007 | Chen et al. | |
| 2008/0028334 A1 | 1/2008 | De Mes | |
| 2008/0104502 A1 | 5/2008 | Olston | |
| 2008/0183672 A1 | 7/2008 | Canon et al. | |
| 2008/0184128 A1 | 7/2008 | Swenson et al. | |
| 2008/0320225 A1 | 12/2008 | Panzer et al. | |
| 2009/0012969 A1 | 1/2009 | Rail et al. | |
| 2009/0164924 A1 | 6/2009 | Flake et al. | |
| 2009/0204478 A1 | 8/2009 | Kaib et al. | |
| 2009/0217199 A1 | 8/2009 | Hara et al. | |
| 2009/0241191 A1 * | 9/2009 | Keromytis et al. | 726/23 |
| 2009/0248680 A1 | 10/2009 | Kalavade | |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0036740 A1 | 2/2010 | Barashi | |
| 2010/0057639 A1 | 3/2010 | Schwarz et al. | |
| 2010/0125507 A1 | 5/2010 | Tarantino, III et al. | |
| 2010/0131594 A1 | 5/2010 | Kashimoto | |
| 2010/0138293 A1 | 6/2010 | Ramer et al. | |
| 2010/0198742 A1 * | 8/2010 | Chang et al. | 705/319 |
| 2010/0218106 A1 | 8/2010 | Chen et al. | |
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0022957 A1 | 1/2011 | Lee | |
| 2011/0029854 A1 | 2/2011 | Nashi et al. | |
| 2011/0055203 A1 | 3/2011 | Gutt et al. | |
| 2011/0066982 A1 * | 3/2011 | Paulsami et al. | 715/835 |
| 2011/0078140 A1 | 3/2011 | Dube et al. | |
| 2011/0078705 A1 | 3/2011 | Maclinovsky et al. | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0208840 A1 * | 8/2011 | Blackman | 709/220 |
| 2011/0246873 A1 | 10/2011 | Tolle et al. | |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0005600 A1 * | 1/2012 | Ito | 715/760 |
| 2012/0072821 A1 | 3/2012 | Bowling | |
| 2012/0084644 A1 | 4/2012 | Robert et al. | |
| 2012/0096365 A1 | 4/2012 | Wilkinson et al. | |
| 2012/0110017 A1 | 5/2012 | Gu et al. | |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0198516 A1 | 8/2012 | Lim | |
| 2012/0215834 A1 | 8/2012 | Chen et al. | |
| 2012/0215919 A1 | 8/2012 | Labat et al. | |
| 2012/0284629 A1 | 11/2012 | Peters et al. | |
| 2012/0317295 A1 * | 12/2012 | Baird et al. | 709/228 |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0080611 A1 | 3/2013 | Li et al. | |

OTHER PUBLICATIONS

Teevan, J., et al., "Changing How People View Changes on the Web," 2009, Proceedings of the 22$^{nd}$ Annual ACM Symposium on User Interface Software and Technology, New York, 2009, pp. 237-246.

Bango, Rey, "How JS & Ajax work in Opera Mini 4", Nov. 2, 2007, XP055050107, Retrieved from the Internet.

Brinkmann, M., "Record and Share your browser history with Hooeey," ghacks.net, Feb. 26, 2008, 6 pages, printed on Jan. 25, 2013.

Considine, A., "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber, et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

(56) References Cited

OTHER PUBLICATIONS

Hopper, D. Ian, "Desktops Now Have Power to Comparison-Shop," Oct. 18, 1999, printed from http://www.cnn.com/TECH/computing/9910/18/r.u.sure/index.html, 3 pages.

Van Kleek, M., Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

\* cited by examiner

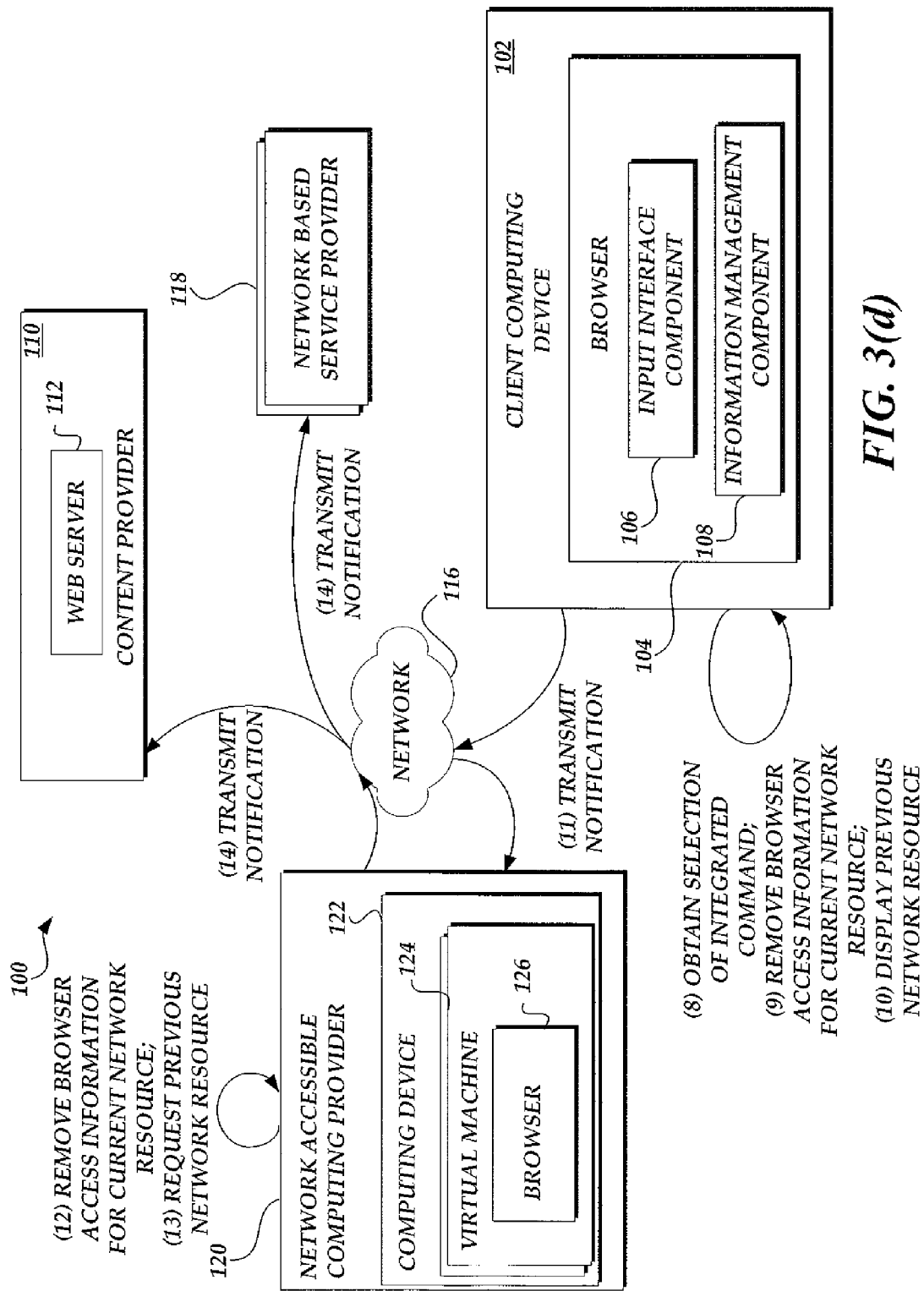

MANAGING INFORMATION ASSOCIATED WITH NETWORK RESOURCES

BACKGROUND

Generally described, computing devices and communication networks can be utilized to exchange information. In one use, a computing device can request information from content providers via a communication network. Content providers can be, for example, Web sites such as blog sites, e-commerce sites, search engines, social network sites and the like. For example, a user of a personal computing device can utilize a browser to request content (e.g., a Web page) from a server computing device via the Internet. In such embodiments, the user computing device can be referred to as a client computing device and the server computing device can be referred to as the content provider.

To facilitate accessing a history of accessed network resources, browsers provide navigation controls that allow users to provide an indication that they wish to return to a previously accessed network resource. For example, browsers provide a graphical icon or control that corresponds to a user request to access the most recent previously accessed network resource, often referred to as a "back button" or "back arrow." Upon receipt of such a request, a browser can utilize an access history of the network resource identifiers (e.g., URLs) that have been accessed over a defined period of time to identify the most recent resource identifier listed in the history and attempt to display and/or access the network resource corresponding to the identifier again. Multiple selections of such a back button navigation control cause the browser to display the network resources in the reverse order of a particular user's access history. A "forward button" navigation control further facilitates selection of content from network resources in the forward order of the user's access history.

Because users can access the same network resources multiple times, browsers often attempt to improve performance and/or convenience by maintaining information about the network resources (e.g., Web pages) that have been accessed. As previously discussed, the information maintained by the browser applications can include an access history of the network resource identifiers (e.g., URLs) that have been accessed over a defined period of time. The information maintained by the browser application can also include user or account identifiers that are exchanged between the browser application and the content provider that allow for the identification of users and customization of content by the content provider. This information may be retained or referenced in what is known as "Web cookies," among other possibilities. Additionally, the information maintained by the browser application can include information provided by a user while accessing a network resource, such as user identifiers/login data, password data, form or text entry data and the like. Still further, the information maintained by the browser can include locally stored (e.g., cached) copies of embedded text, images and other content utilized in the rendering of the network resource, such as in a file or memory.

BRIEF DESCRIPTION OF THE DRAWINGS

The foregoing aspects and many of the attendant advantages will become more readily appreciated by reference to the following detailed description, when taken in conjunction with the accompanying drawings, wherein:

FIGS. 3(b)-3(d) are block diagrams of the content delivery environment of FIG. 2(a) illustrating the accessing of network resources and the processing of an integrated command to remove information associated with a current network resource and access a previously accessed network resource;

DETAILED DESCRIPTION

Figure 1A:
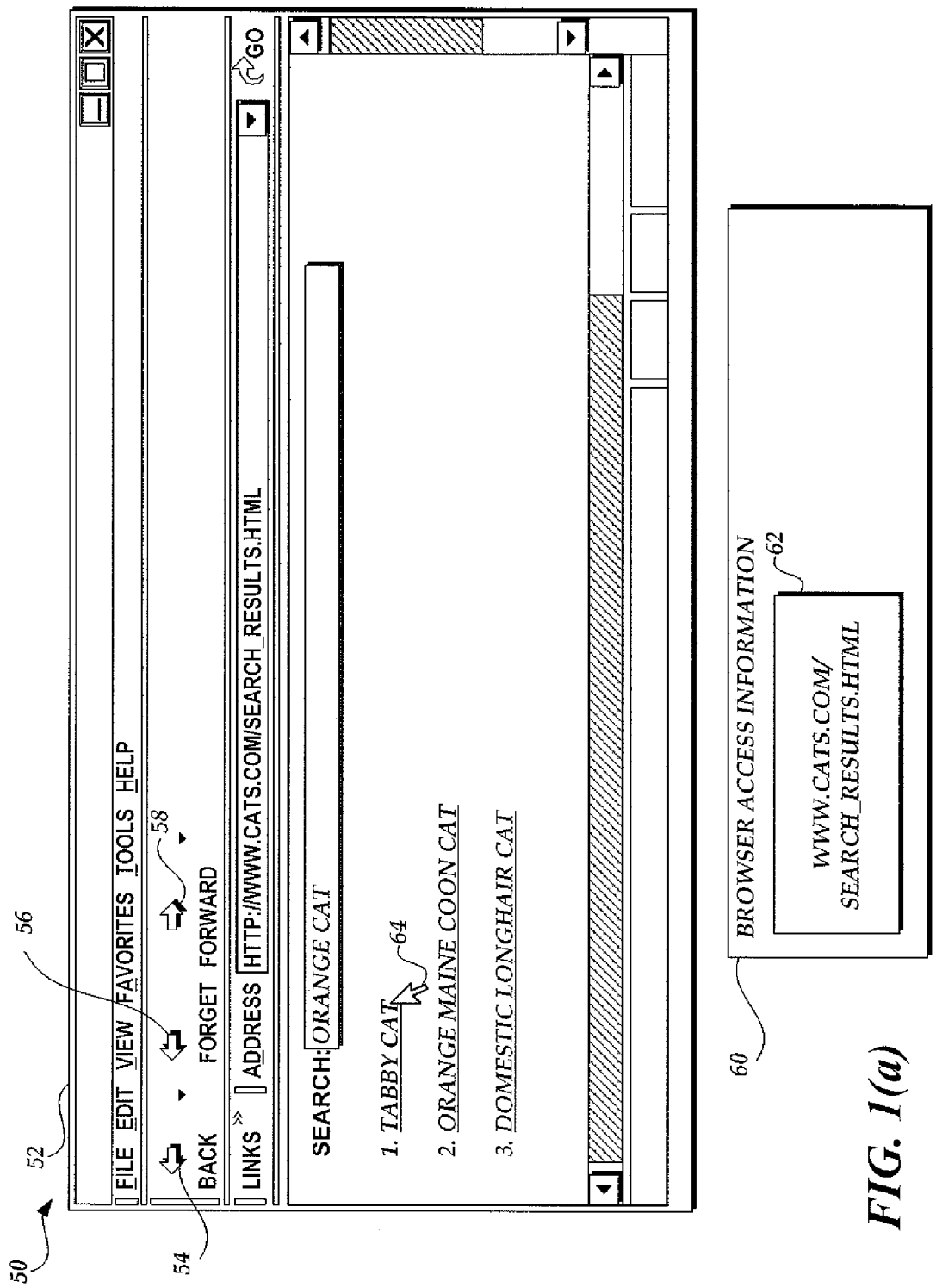
FIGS. 1(a)-1(c) depict example user interfaces generated by a browser for presenting one or more controls corresponding to an integrated command to remove information associated with a current network resource and access a previously accessed network resource.

Generally described, aspects of the present disclosure relate to the management of content and information corresponding to the access of content. Specifically, aspects of the present disclosure relate to the selective management of information collected by a software application such as a browser. The browser obtains content by accessing a network resource, such as a Web page, from a content provider and collects information associated with the display and interaction of the network resource by a user. In one embodiment, the browser presents, among other controls or icons, a graphical icon that is representative of an integrated command to remove access information collected while accessing the current network resource and to cause the browser application to return to display a previously accessed network resource. Thus, responsive to a selection of the graphical icon, the browser removes at least a portion of the access information associated with the current network resource and also displays the previously accessed network resource without any additional interaction from the user. Accordingly, the user is able to return to the previously displayed Web page and remove the appropriate access information from the computing device such that the computing device returns to a state before the Web browser accessed the current network resource, all in a single action.

For purposes of illustration, a user accesses a series of Web pages utilizing a browser on a client computing device, e.g., a tablet computer, a personal computer, an e-book reader, etc. As the browser is accessing each Web page under the control of a user, the browser is configured to collect and maintain access information, such as by adding the URL of the current Web page to a history, storing cookies transmitted by the content provider and saving password and form information utilized while the user accessed the Web page. During the particular browsing session, the user utilizes conventional navigation controls to access a previously accessed Web page (e.g., a "back button") and return to the Web page (e.g., a "forward button"). At some point, however, the user decides that he or she wishes to not only return to the previously accessed Web page, but that at least some or all information associated with the current Web page should be removed by the browser application. In this respect, the computing device returns to a state before the Web browser accessed the Web page and electronic artifacts stored on the computing device are removed. Accordingly, the user selects a different navigation control that corresponds to an integrated command to access the previously accessed Web page and to remove all the access information the browser application had collected when the user accessed the current Web page ("integrated command"). From the user perspective, the browser deletes at least some or all information corresponding to the current Web page and automatically accesses the previously accessed Web page by simply selecting the integrated command.

In another illustrative example, a user accesses a Web page that corresponds to a search provider. Based on a search query, the search provider returns a listing of URLs that may be relevant to the search query. Upon accessing one of the identified URLs, the user determines that this URL was either not appropriate or not relevant. By selecting a graphical control that corresponds to the integrated command, the user can return to the previously accessed Web page that included the search results and cause the removal of at least some or all information from the browser that is associated with the URL that was determined to be not appropriate or not relevant. Additionally, in the same or another embodiment, the browser can be configured to transmit a notification to the search provider that informs the search provider that the user utilized the integrated command. As such, the search provider can utilize the information to, among other possibilities, modify its relevance ranking systems such that the search listings for subsequent queries by the users and/or others is modified. In some embodiments, the search provider can modify the presentation of the URL to the user to be indicative of the user's previous utilization of the integrated command with respect to the network resource at that URL. In some embodiments the search provider can alert other users that the integrated action of deleting and displaying the previous Web page has occurred with one or more other users.

According to another example, a user accesses a Web page that corresponds to an e-commerce provider. The user is browsing a selection of items for consumption (e.g., sale, rental, etc.) presented through a browser interface. The e-commerce provider uses the browsing activity of the users to later make suggestions to the user in which the user may be interested. For example, if the user has browsed mystery books in the past, the e-commerce Web site may provide automated recommendations for mystery books in the future. While the user is searching for items in the catalog the user views a product Web page listing details for an item that does not accurately reflect the user's interests and for which the user does not want their automated recommendations to present related products. To avoid this issue, the user then selects the graphical control that corresponds to the integrated command causing the software browsing application to return to displaying the previously accessed Web page (e.g., a prior product page, browse page, search result page) and causes the removal of all access information from the browser that is associated with the URL associated with the product page that lists details for the item that does not accurately reflect the user's interests. Additionally, in one embodiment, without any additional action by the user, the browser transmits a notification to the e-commerce provider informing it that the user utilized the integrated command. As such, the e-commerce provider can utilize the information to, among other possibilities, remove the product page from the user's browsing history such that its visit does not affect the user's recommendations. In some embodiments the e-commerce provider could modify the presentation of the URL to the user to be indicative of previous utilization of the integrated command or could alert other users that the integrated action of deleting and displaying the previous product page has occurred with one or more other users.

Although examples are provided in which the browser displays the most recently accessed network resource in response to a user selecting the integrated command, in other embodiments the integrated command may cause the browser to display any of a number of other network resources. For example, the browser application may display a predefined network resource, such as a "home page." Additionally, in some embodiments the browser application could display a subsequent viewed page in a user's access history in response to the integrated command.

With reference to the previous illustrative examples, the user can be presented with a number of graphical icons that are associated with an integrated command. In one approach, a browser can include a first graphical icon that corresponds to a traditional "back button" and a second graphical icon that corresponds to the integrated command. In this approach, the two graphical icons can be distinguished based on size, color or placement on the display screen. In another approach, a browser can include a single graphic icon that corresponds to a combination of a conventional "back button" and the integrated command. In one example, a graphical icon can include a portion for selecting the functionality traditionally associated with a back navigation control and a second portion for selecting the integrated command. In another example, the control corresponding to the functionality traditionally associated with a back navigation control is embodied as a small back button icon that can be at least partially superimposed over a larger icon corresponding to the integrated command.

In accordance with another illustrative example, a user accesses one or more Web pages utilizing a computing device that has a touch user interface. As the user is accessing a particular Web page, the user decides that he or she wishes to not only return to a previously accessed Web page, but that information associated with the current Web page should be removed by the browser. In lieu of manipulating any type of graphical icon, the user makes some type of gesture on the touch interface (e.g., a swipe pattern) or selects a quadrant of the touch interface (e.g., holding a finger down for a predetermined time). Based on the gesture, the browser, without any additional interaction from the user, deletes all access information on the computing device corresponding to the current Web page and accesses the previously accessed Web page.

In accordance with a further illustrative example, a user accesses one or more Web pages utilizing a computing device that has audio input (e.g., a microphone). As the user is accessing a particular Web page, the user decides that he or she wishes to not only return to a previously accessed Web page, but that at least some or all information associated with the current Web page should be removed by the browser. In this example, to initiate the integrated command control, the user utters a predetermined phrase, such as "Back and Forget." Based on processing and matching the received voice data, the browser, without any additional interaction from the user, deletes at least some or all information corresponding to the current Web page and accesses the previously accessed Web page.

With reference to yet another illustrative example, a user initiates a request for a Web page utilizing a browser. In this example, the request for the Web page is transmitted to a network accessible computing provider that initiates a network-based virtual machine instance that requests the Web page on behalf of the client computing device via a browser executing on the virtual machine instance. The browser executing on the virtual machine instance works in conjunction with the browser on the client computing device in order to process the content associated with the current Web page. During a particular browsing session, the user utilizes traditional navigation controls to access one or more Web pages, information of which is maintained as browser access information at both the client computing device and the virtual machine instance. At some point, the user selects or initiates a control corresponding to the integrated command (e.g., the selection of a graphical icon) and the browser, without any additional interaction from the user, deletes all access information corresponding to the current Web page maintained on the client computing device. Additionally, the browser transmits a notification to the virtual machine instance to cause the same processing of the received integrated command on the browser executing on the virtual machine instance.

As used herein, the information collected or generated by the browser or client computing device while accessing network resources will be collectively referred to as "browser access information." However, reference to "browser access information" does not imply any limitation as to any singular type or specific instance of information or any combination of information. Additionally, although various examples in the detailed description describe removal of the browser access information, any modification of the information that effectively removes any history of the computing system accessing the network resource is contemplated. For example, modifications such as deletion, encryption or obfuscation of the browser access information is contemplated. The browser access information could also be modified by moving it to another location (e.g., in a location not accessible by the browser). Additionally, reference to "client computing device" will not necessarily be limited to any particular type of device or to the illustrative examples of devices described herein. Still further, reference to "browser" will not necessarily be limited as to any type of software application and does not prevent the incorporation of aspects of the present disclosure into other types of software applications or operating system functionality. For example, although a browser application is used to describe various embodiments the application could be, among others, an application dedicated for the navigation content of a specific remote content provider such as commonly used on mobile devices, tablets, e-readers and the like. Although aspects of the present disclosure will be described with regard to an illustrative network environments and component interactions, flow diagrams, graphical icons and user interfaces, one skilled in the relevant art will appreciate that the disclosed embodiments are illustrative in nature and should not be construed as limiting.

Figure 1B:
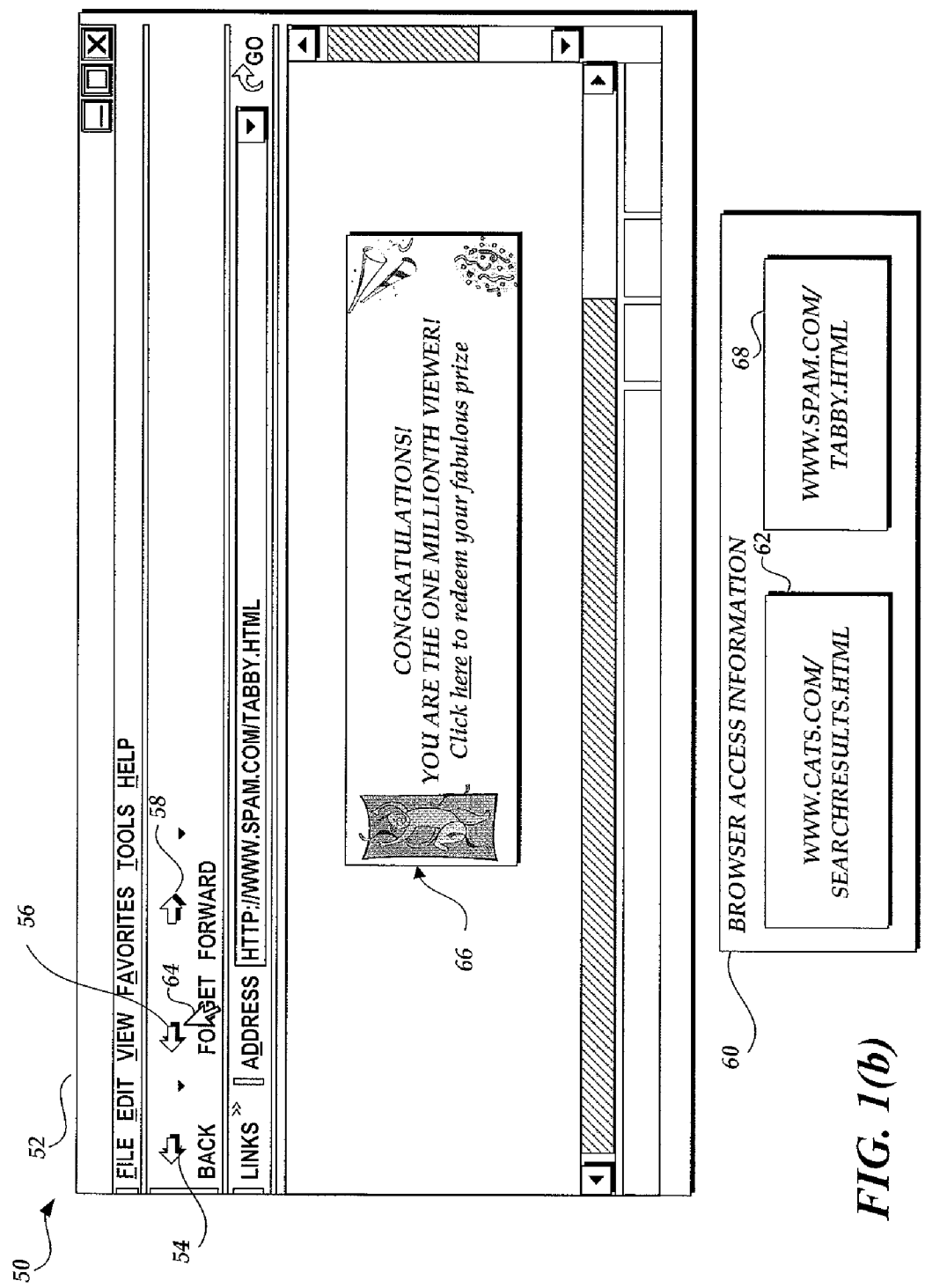
Figure 1C:
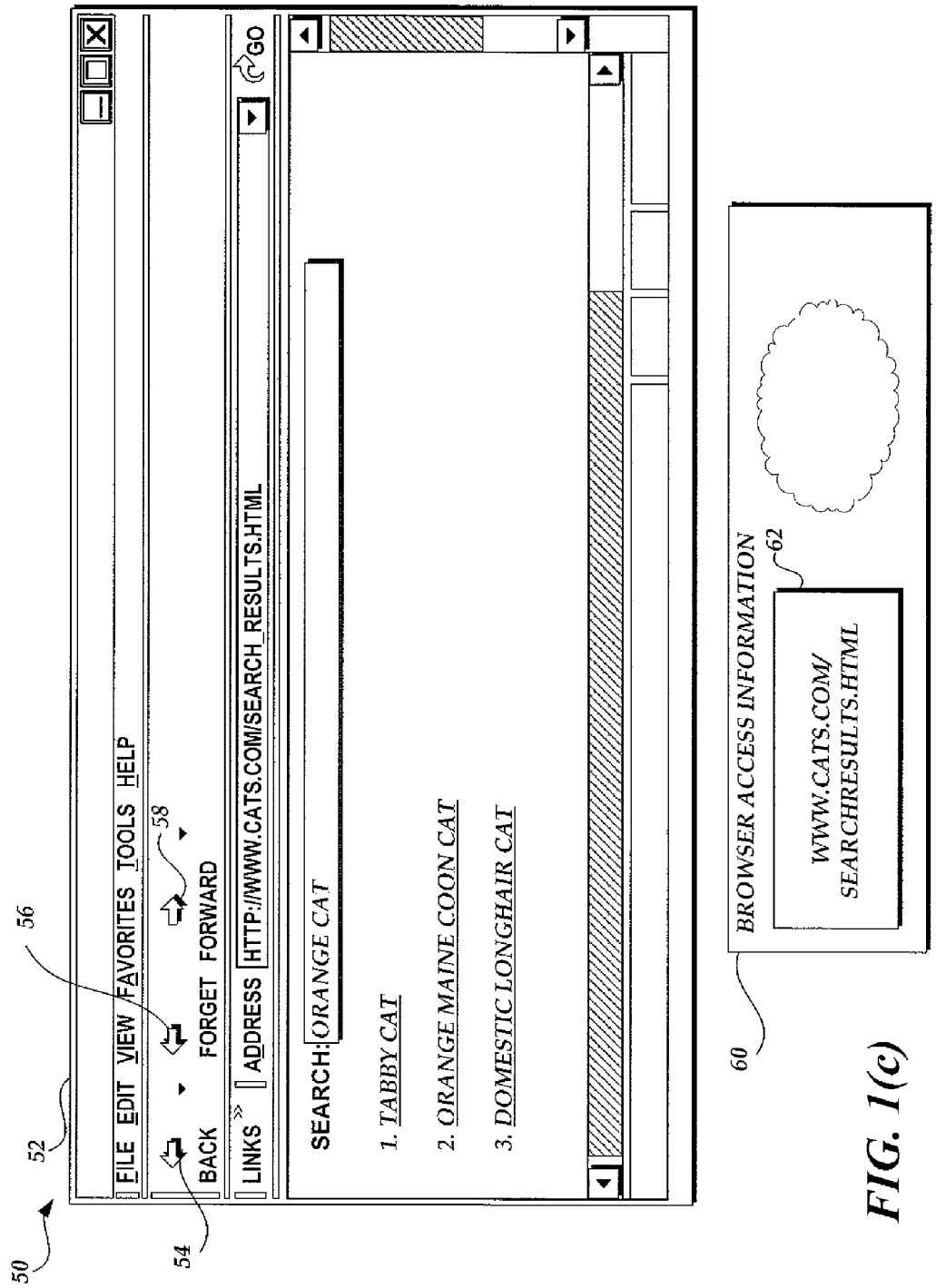

FIGS. 1(a)-1(c) depict example user interfaces generated by a browser 50 for presenting one or more controls corresponding to an integrated command to remove information associated with a current network resource and access a previously accessed network resource. With reference to FIG. 1(a), in one embodiment, a user interface 52 generated by the browser 50 displays a set of selectable controls (e.g., buttons) that are presented to users as they access a network resource. The set of controls can include a first control 54 reflective of a command to access a previously accessed network resource without deleting any browser access information (e.g., a conventional "back button"). The set of controls also include a second, separate control 56, labeled "FORGET," reflective of an integrated command to remove information associated with a current network resource and to access a previously accessed network resource. The user interface 52 can also include an additional control 58, such as a conventional forward button, for additional navigation control to access a network resource in the forward direction of a user's access history. Browser access information 60 represents information stored in a client computing device (not shown) relating to the access of a particular network resource (e.g., user identification information, account identification information, cookies, electronic tokens, cached content and the like). For example, in FIG. 1(a), a user has searched for information related to "ORANGE CAT" at the network resource www.cats.com and has been delivered the results at www.cats.com/search_results.html. Block 62 represents the electronic artifacts left behind in the browser access information from the access of this page. These artifacts may include, for example, cached search results as depicted in FIG. 1(a) and a history of the access of this network resource. A user then selects, with cursor 64, a hyperlink representing the search result for "Tabby Cat", which has an associated network resource identifier of www.spam.com/tabby.html.

FIG. 1(b) depicts the resulting Web page delivered by accessing www.spam.com/tabby.html. The Web page includes text and an image represented as content 66. In this illustrated example, the text indicates that the user is the one millionth viewer of the network resource and that he or she has won a prize. Content 66, among other information about the user's access (i.e., history information, cookie information, etc.), may be stored in the browser access information 60 represented by block 68. In this example, when the Web page is displayed the user may realize that he or she is not interested in this Web page and may even worry that the Web page includes malicious content. As such, the user may select the control 56 labeled "FORGET" to return to the search results and remove any electronic artifacts related to the access of at least this Web page. As described above, control 56 is reflective of an integrated command to remove information associated with a current network resource and to access the previously accessed network resource.

Accordingly, FIG. 1(c) depicts a user interface as depicted after the user selects the integrated command. Specifically, the search results at the previously accessed network resource (www.cats.com/search_results.html) are shown. However, the browser access information 60 from block 68 (FIG. 1(b)) has been removed, thereby leaving no electronic artifacts, such as content 66 (FIG. 1(b)), based on the access of www.spam.com/tabby.html. Thus, the user's selection of the integrated command deletes the browser access information 60 related to the network resource from the computing device such that it appears as if the user never accessed the www.s-pam.com/tabby.html Web site.

Figure 2A:
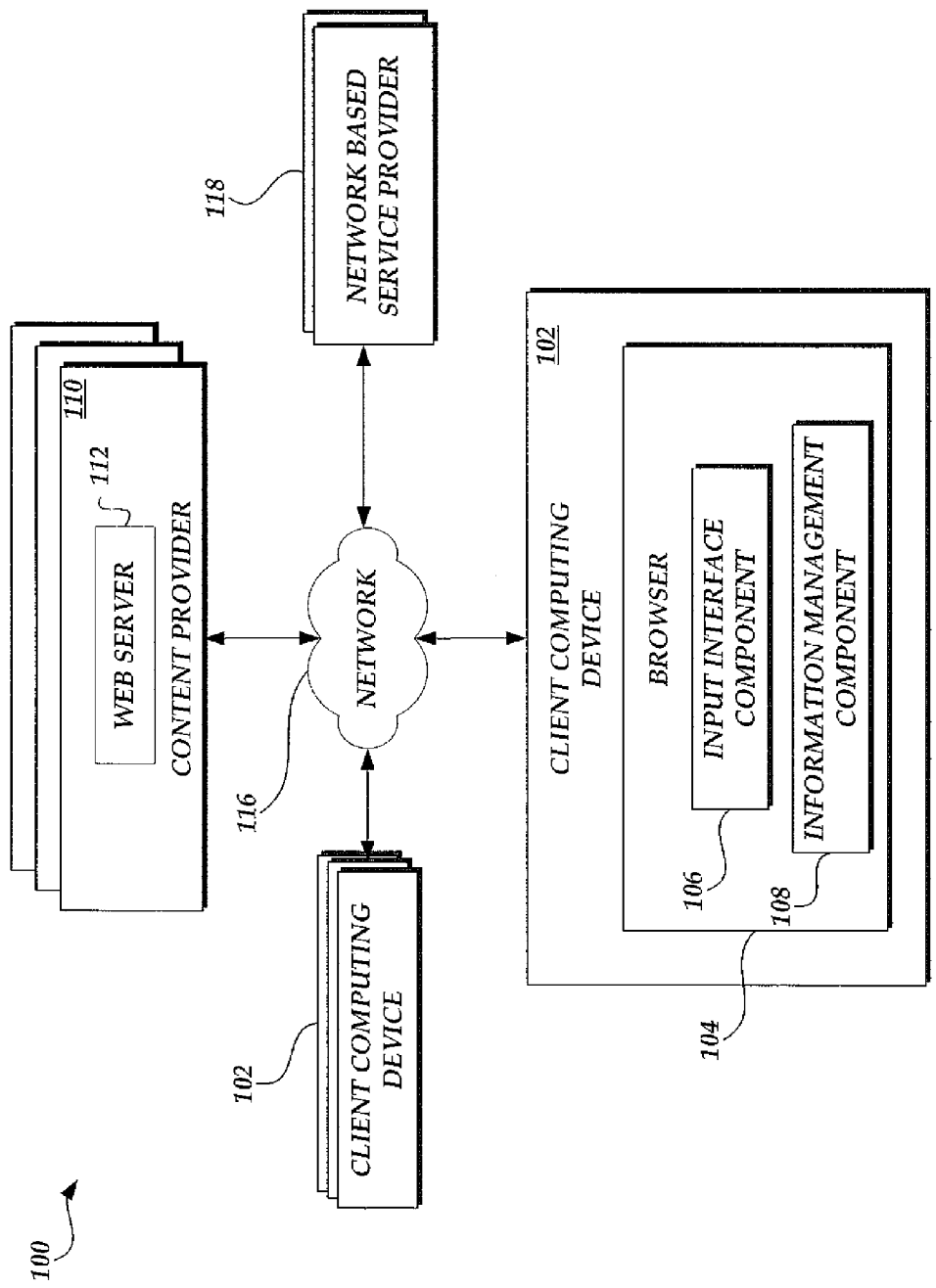
FIG. 2(a) is a block diagram illustrative of a content delivery environment including a number of client computing devices and a content provider.

With reference now to FIG. 2(a), a block diagram illustrative of a content delivery environment 100 for accessing network resources and managing access information associated with the access of the network resources will be described. As illustrated in FIG. 2(a), the content delivery environment 100 includes a number of client computing devices 102 for requesting network resources from content providers 110. In an illustrative embodiment, the client computing devices 102 can correspond to a wide variety of computing devices including personal computing devices, laptop computing devices, hand-held computing devices, terminal computing devices, mobile devices (e.g., mobile phones, tablet computing devices, e-book readers, etc.), wireless devices, various electronic devices and appliances and the like. The content delivery environment 100 can include any number of and types of client computing devices 102.

In an illustrative embodiment, the client computing devices 102 include necessary hardware and software components for establishing communications over a communication network 116, such as a wide area network or local area network. For example, the client computing devices 102 may be equipped with networking equipment and browsers that facilitate communications via the Internet or an intranet.

Illustratively, the client computing devices 102 may have varied local computing resources such as central processing units and architectures, memory, mass storage, graphics processing units, communication network availability and bandwidth, etc. Generally, however, each client computing device 102 may include one or more processing units, such as one or more CPUs. The client computing device 102 may also include system memory, which may correspond to any combination of volatile and/or non-volatile storage mechanisms. The system memory may store information that provides an operating system component, various program modules, program data or other components. The client computing device 102 performs functions by using the processing unit(s) to execute instructions provided by the system memory. The client computing device 102 may also include one or more input devices (keyboard, mouse device, specialized selection keys, touch screen interface, stylus, etc.) and one or more output devices (displays, printers, audio output mechanisms, etc.). The client computing device 102 may also include one or more types of removable storage and one or more types of non-removable storage. Still further, the client computing device 102 can include communication components for facilitating communication via wired and wireless communication networks, such as the wireless communication network 116.

As illustrated in FIG. 2(a), the client computing devices 102 can include, among other hardware or software components, a browser 104 for facilitating access to network resources, such as Web pages provided by the content provider 110. The browser 104 can correspond to a stand-alone software application or be integrated in conjunction with other software applications, software components or operating environments. Alternatively, the software browser application can be a monolithic application, i.e., the software browser application can include data access instructions. In this example embodiment, the software browser application can run directly on the hardware of the computing device 102 and an operating system is not required. Illustratively, the browser 104 includes an input interface component 106 for obtaining information associated with the selection of various user input and determining whether the input corresponds to an integrated command to remove information associated with a current network resource and display and/or access a previously accessed network resource. The input interface component 106 is further operable for transmitting notifications, to an entity, of the selection of an integrated command to delete information associated with a current network resource and display and/or access a previously accessed network resource. The entity could be, for example, the content provider of the current network resource, an entity that aggregates information associated with the integrated command or a network accessible computing provider that executes at least a portion of the browser, among other possibilities. The browser 104 also includes an information management component 108 for processing requests to implement an integrated command to delete information associated with a current network resource and display and/or access a previously accessed network resource. Although the input interface component 106 and information management component 108 are illustrated as logically included in the browser 104, the components may be implemented in other software applications, combined or implemented as separate, stand-alone software applications.

The content delivery environment 100 can also include one or more content providers 110 in communication with the one or more client computing devices 102 or other service providers via the communication network 116. The content provider 110 illustrated in FIG. 2(a) corresponds to a logical association of one or more client computing devices. Specifically, in some embodiments, the content provider 110 can include a Web server 112 corresponding to one or more server computing devices for obtaining and processing requests for content (such as Web pages or Web service information) from the client computing devices 102. One skilled in the relevant art will appreciate that the content provider 110 can be associated with various additional computing resources, such as additional computing devices for administration of content and resources, domain name service (DNS) name servers, application servers, proxy servers and the like. For example, although not illustrated in FIG. 2(a), the content provider 110 can be associated with one or more DNS name server components that would be authoritative to resolve client computing device DNS queries corresponding to a domain of the content provider. Although only a single content provider 110 is illustrated in FIG. 2(a), the content delivery environment 100 can include any number of content providers, including various grouping of content providers. For example, other content providers can correspond to an entity such as a network-based service provider, such as search service providers (e.g., search engines), content management service providers, content delivery service providers and the like.

With continued reference to FIG. 2(a), the content delivery environment 100 can include a number of other entities such as network based service providers 118. Network based service providers 118 can be, for example, other content providers (e.g. search service providers, e-commerce sites, blogs, etc.), content management service providers, content delivery service providers, entities that aggregate information associated with the integrated commands used by users and the like.

Figure 2B:
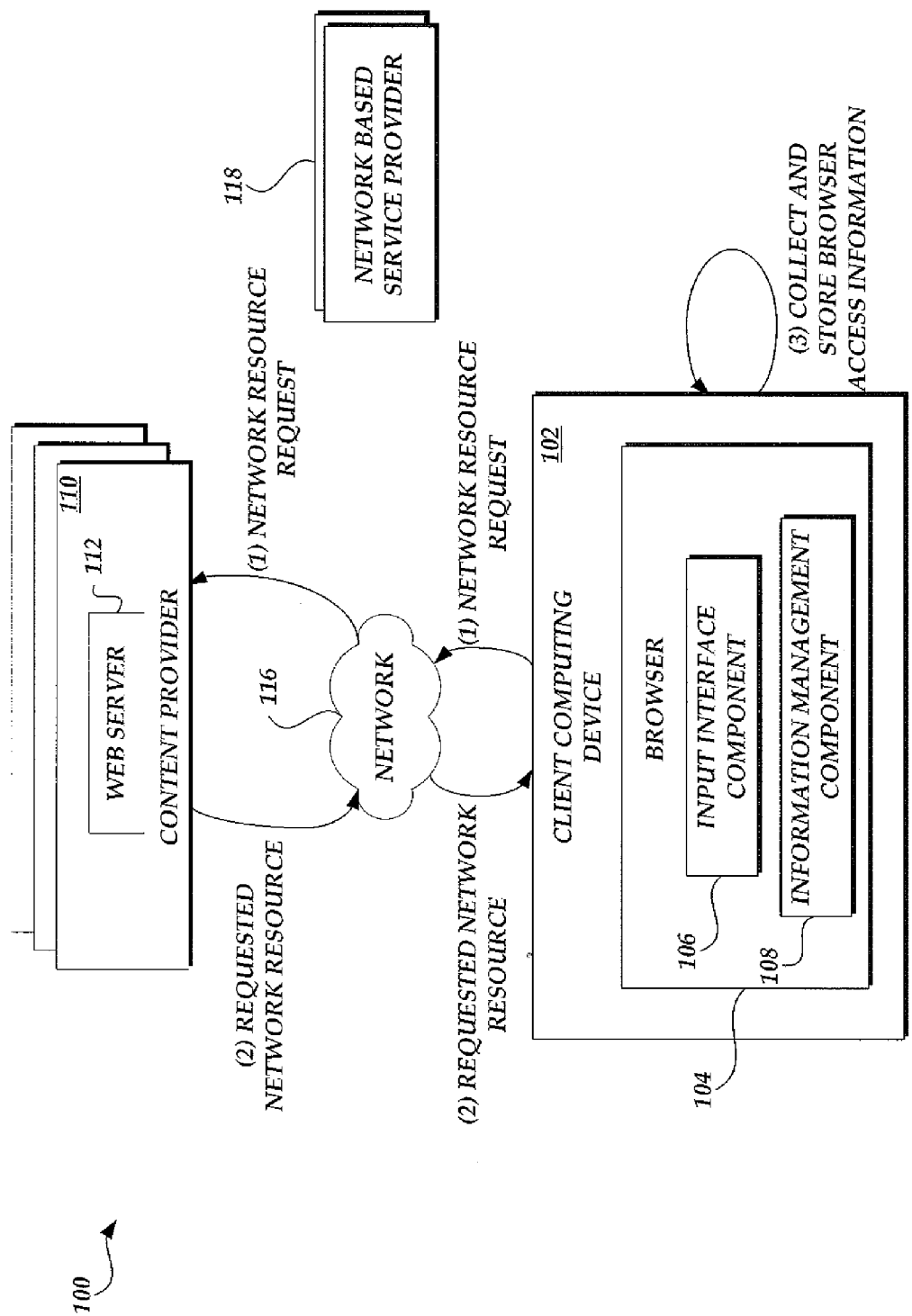
FIGS. 2(b) and 2(c) are block diagrams of the content delivery environment of FIG. 2(a) illustrating the accessing of network resources and the processing of an integrated command to remove information associated with a current network resource and access a previously accessed network resource.
Figure 2C:
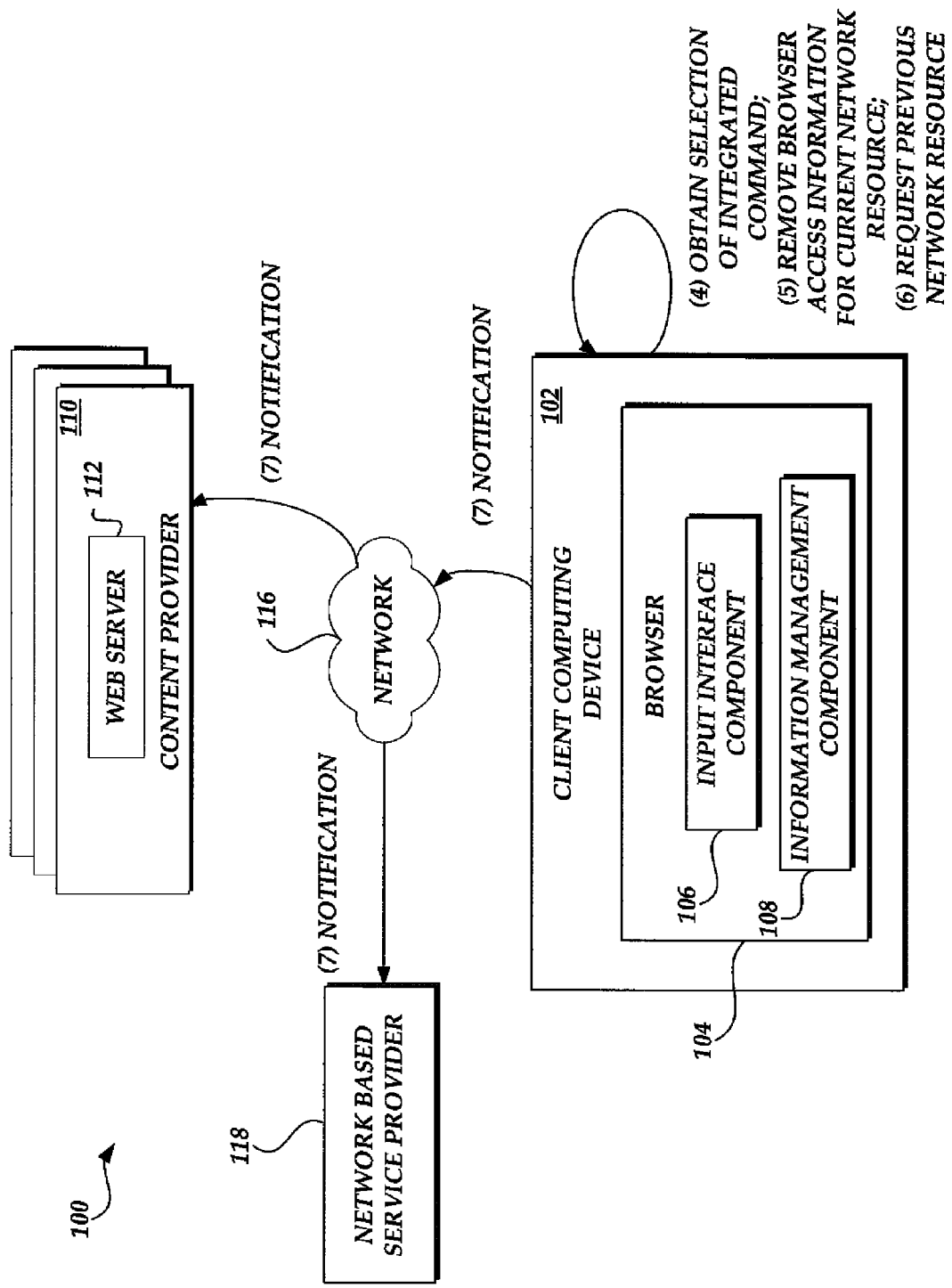

With reference now to FIGS. 2(b) and 2(c), the interaction between various components of the content delivery environment 100 of FIG. 2(a) will be illustrated. Specifically, FIG. 2(b) illustrates the interaction between various components of the content delivery environment 100 for the exchange of content between a client computing device 102 and a content provider 110 via communication network 116. FIG. 2(c) illustrates the interaction between various components of the content delivery environment 100 with regard to the processing of an integrated command to remove information associated with a currently accessed network resource and to display a previously accessed network resource. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2(b), illustratively, a client computing device 102 initiates a request (1) for content by identification of a desired network resource, such as via identification of a specific URL. In one example, the browser 104 receives an input of a specific URL to access. In one example, the URL is input using a keyboard associated with the client computing device 102. In another example, a user can manipulate a graphical user interface to select an object, such as a selection of an embedded hyperlink or selection of an entry in a "Favorites" listing. The manipulation of the graphical user interface results in the browser 104 receiving or recalling the information (e.g., the URL or network address) used to access the desired network resource. As illustrated in FIG. 2(b), the content request is received by an appropriate content provider 110 and processed to provide (2) the requested network resource.

Upon accessing the network resource (e.g., a Web page, document, video object, audio object, etc.) and receiving any associated content from the content provider 110, the client computing device 102, via browser 104, begins collecting (3) various information related to the access of the specific network resource. As previously described, such information can be generally referred to as browser access information (or access information). Illustratively, the browser access information can include the URL, or other network resource identifier, that can then be added to a history of URLs maintained by the browser 104. The browser access information can also include user identification information or account identification information provided by the content provider 110 or generated on behalf of a user/user account associated with the client computing device 102. Examples of the user or account identification information can include display preferences, content filtering preferences, cookies, electronic tokens and the like. The browser access information can further include information associated with the presentation of content on the client computing device 102 or with the interaction with the network resource, including, but not limited to, form data, password data, downloaded images and text, advertisements, video content and the like.

With reference to FIG. 2(c), at some point after accessing the network resource and collecting the browser access information, the browser 104 obtains (4) an input from a user that is interpreted as a selection of the integrated command to remove information associated with a current network resource and display and/or access a previously accessed network resource, which, as previously described, will be referred to as the integrated command. Responsive to the selection of the integrated command, the browser 104 removes (5), or causes to be removed, at least a subset of the browser access information collected by the browser and associated with the currently accessed network resource. Illustratively, the selection of the information (or type of information) that will be removed can be made in accordance with configuration information provided by a user or system administrator. The browser 104 can cause the deletion of browser access information collected during the most recent access to the current network resource. Additionally, the browser 104 can cause the deletion of browser access information collected during all previous accesses to the current network resource utilizing a single action by the user.

In addition to the deletion of selected browser access information, the browser 104 can request (6) a previously accessed network resource, such as the network resource that immediately preceded the current network resource, or some other specified network resource, such as one associated with a browser "home" page. The browser 104 may be able to display and/or access the previously accessed network resource, at least in part, with the utilization of cached information and proxy server components. Thus, in some embodiments the access of the previously accessed network resource causes the browser to retrieve the network resource from the content provider again before displaying it. However, in some embodiments the browser retrieves the previously accessed network resource from its internal cache and/or intermediate client computing devices rather than accessing the network resource by retrieving it over the network (again) from the content provider. For example, suppose that access information for the current network resource and access information for the previously accessed network resource are stored on the client computing device 102. In this specific example, if the integrated command is selected, the browser access information associated with the current network resource is deleted and the access information for the previously accessed network resource is used to return the browser 104 to the previously accessed network resource.

As further illustrated in FIG. 2(c), the browser 104 can transmit (7) one or more notifications indicative of the receipt and determination of an integrated command to one or more specific entities, such as content providers or other network based-service providers. In one example, the notification may be transmitted to the content provider 110 associated with the current network resource or one or more other network based service providers 118, such as a search provider or reporting service. The search provider may be a search engine that uses the information to, among other things, assist in determining relevant search results for particular keywords. The reporting service may collect information about the notifications and provide this information to other entities. In some embodiments other entities may subscribe to the reporting service to periodically (or in real time) determine which of their own network resources or the resources of others have been subject to use of the integrated command by various users. The notifications can be sent either in real time (e.g., substantially close to the time when the integrated command was selected) or could be sent at some time substantially after the time the integrated command was selected at the client computing device. In embodiments in which the notifications are sent at some time substantially after the time the integrated command was selected the notifications may be sent as a batch (e.g., once or a few times per day, among other possibilities).

Figure 3A:
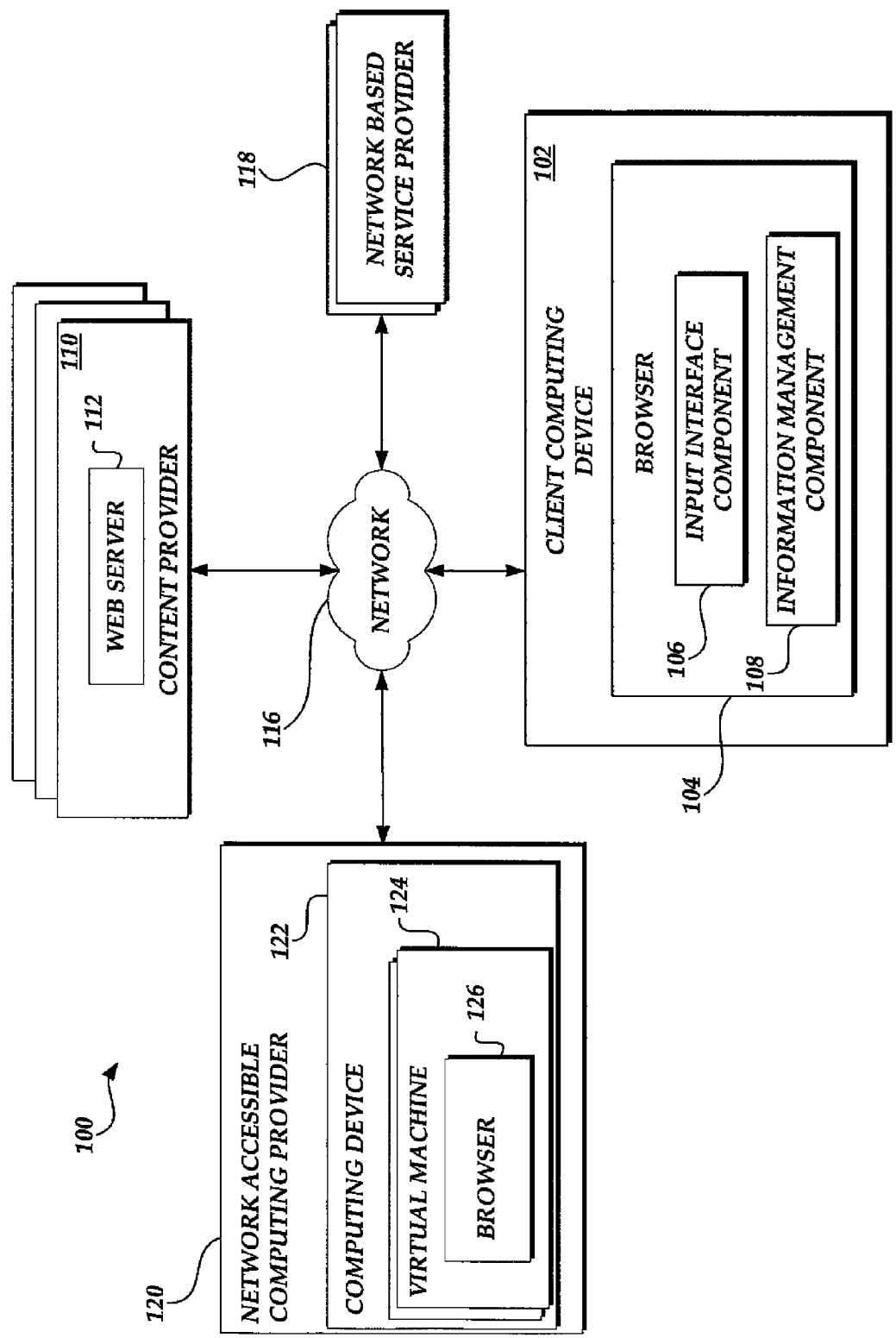
FIG. 3(a) is a block diagram illustrative of a content delivery environment including a number of client computing devices, a content provider and a network accessible computing provider.

With reference now to FIG. 3(a), a block diagram illustrative of another embodiment of a content delivery environment 100 for accessing network resources from content providers 110 and managing information associated with the access of the network resources will be described. As illustrated in FIG. 3(a), the content delivery environment 100 includes a number of client computing devices 102 for requesting content from content providers 110. In an illustrative embodiment, the client computing devices 102, content providers 110 and network-based service providers 118 can operate in a manner substantially similar to the functionality discussed with regard to FIG. 2(a).

With continued reference to FIG. 3(a), the content delivery environment 100 can also include a network accessible computing provider 120 in communication with the one or more client computing devices 102, the content provider 110 and the network based service provider 118 via the communication network 116. The network accessible computing provider 120 corresponds to a logical association of one or more computing devices 122 associated with a network accessible computing provider 120. Specifically, the network accessible computing provider 120 can include a number of Point of Presence (POP) locations that correspond to nodes on the communication network 116. Each POP includes a network computing component (NCC) for hosting applications, such as data streaming applications, among others, via a number of instances of a virtual machine 124, generally referred to as an instance of an NCC.

One skilled in the relevant art will appreciate that NCCs utilize physical computing device resources and software to provide multiple instances of a virtual machine or to dynamically cause the creation of instances of a virtual machine. As applied to the present disclosure, the virtual machine instances execute a browser 126 that is in communication with the browser 104 on the client computing device 102. In this embodiment, the browser executed on the virtual machine instance works in conjunction with the browser 104 on the client computing device 102 to process content retrieved from content provider 110. The NCCs may further include additional software or hardware components that facilitate communications including, but not limited to, load balancing or load sharing software or hardware components for selecting instances of a virtual machine supporting a requested application or providing information to a DNS nameserver to facilitate request routing. Although embodiments of the NCC are described as using virtual machines to host browsers 126 in communication with the browser 104 on the client computing device, in some embodiments the browsers may be hosted on physical (non-virtual) machines such as computing device 122.

Figure 3B:
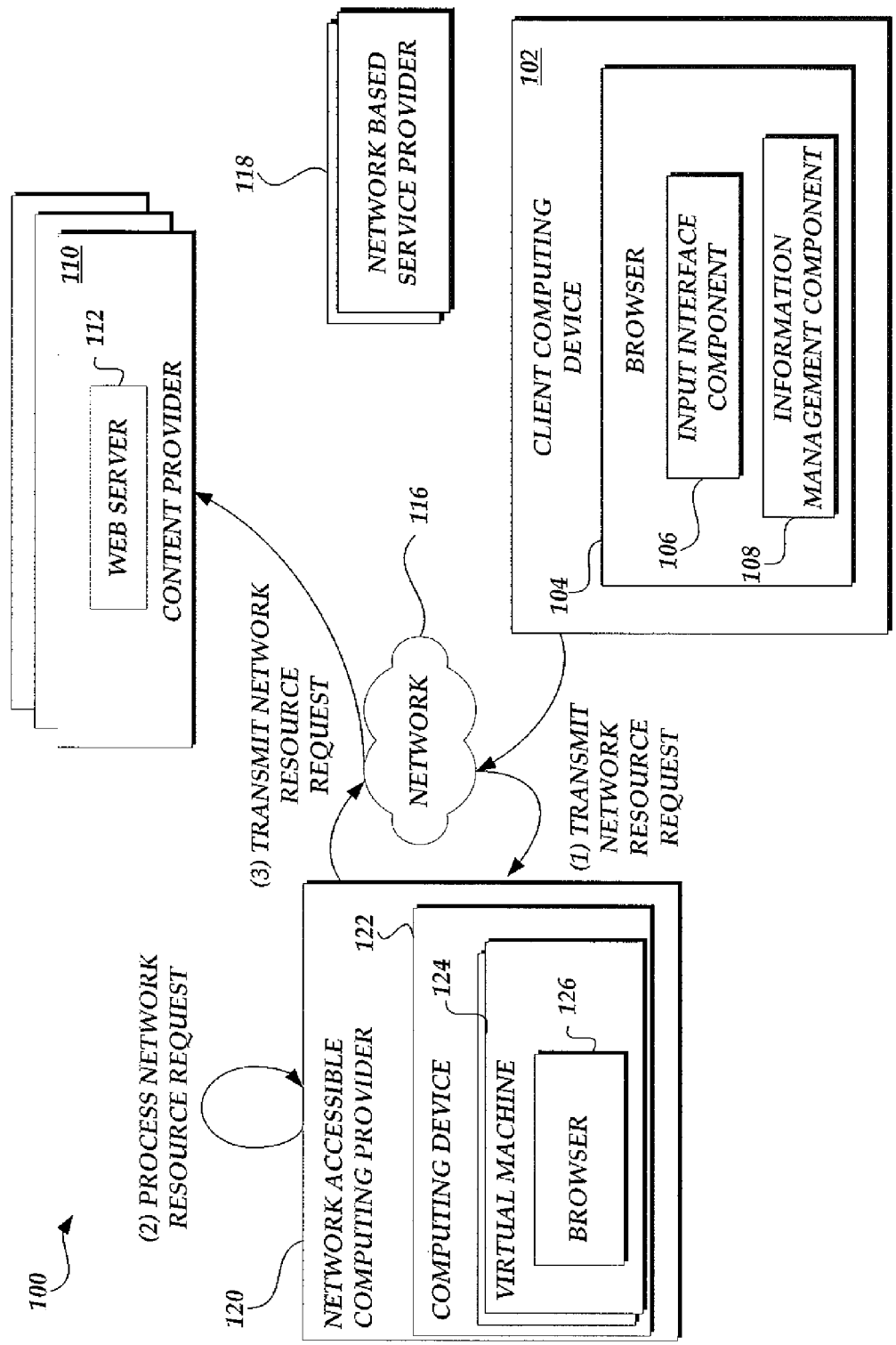
Figure 3C:
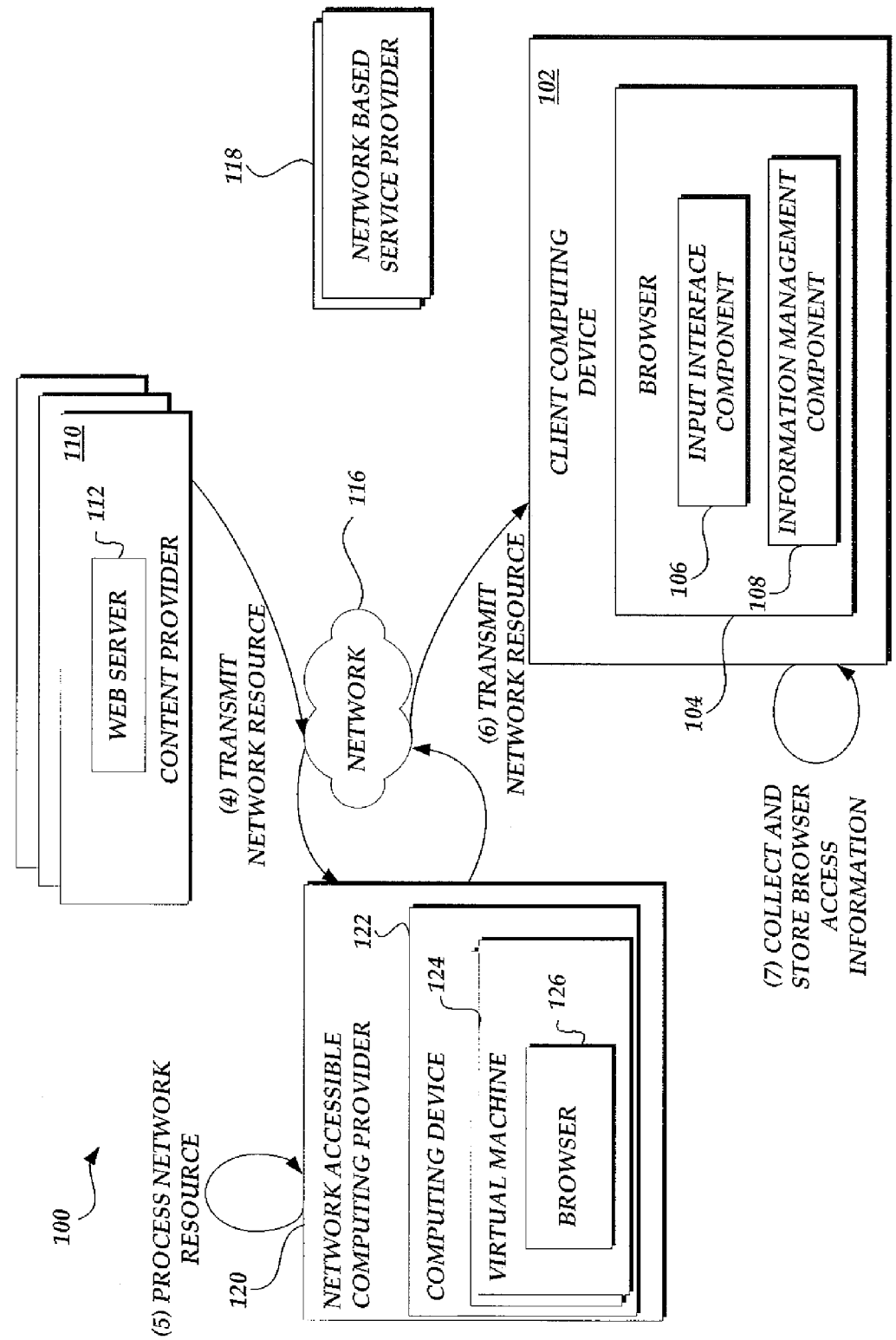

With reference now to FIGS. 3(b)-3(d), the interaction between various components of the content delivery environment 100 of FIG. 3(a) will be illustrated. Specifically, FIG. 3(b) illustrates the interaction between various components of the content delivery environment 100 for the exchange of content between a client computing device 102, the network accessible computing provider 120 and a content provider 110 via communication network 116. FIGS. 3(c) and 3(d) illustrate the interaction between various components of the content delivery environment 100 with regard to the processing of an integrated command to remove information associated with a currently accessed network resource and to access a previously accessed network resource. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 3(b), illustratively, a client computing device 102 initiates a request for a network resource by identification of the network resource, such as via a URL. As previously described, in one example, the browser 104 receives an input of a specific URL to access, such via a keyboard associated with the client computing device 102. In another example, a user can manipulate a graphical user interface to select a URL from a previously accessed Web page such that the browser 104 is provided the information required to access the network resource. In FIG. 3(b), the request for the network resource is handled partly through the browser 104 of client computing device 102 and partly by the browser 126 residing within network accessible computing provider 120, where both operate together, in concert, to retrieve and display the network resource on client computing device 102.

As illustrated in FIG. 3(b), the network resource request is transmitted (1) by client computing device 102 and received by the network accessible computing provider 120, which processes (2) the network resource request. In one embodiment, the network accessible computing provider 120 can instantiate a virtual machine instance 124 to execute a browser 126 that will work in parallel with the browser 104 to render the content associated with the network resource for display. In another embodiment, network accessible computing provider 120 may already have an instantiated virtual machine instance 124 for processing the network resource request. Thereafter, a network resource request is transmitted (3) to an appropriate content provider 110 and processed by the content provider to provide the requested network resource to the network accessible computing provider 120 and the client computing device 102. Illustrative embodiments for accessing content based on browsers executing on client computing devices 102 and network accessible computing provider 120 components are described in co-pending and commonly owned U.S. patent application Ser. No. 13/174,615, entitled "Remote Browsing Session Management," filed on Jun. 30, 2011, and incorporated by reference in its entirety herein.

With reference to FIG. 3(c), the network resource is transmitted (4) from content provider 110 to the network accessible computing provider 120. Network accessible computing provider 120 processes (5) the network resource by performing various operations described in the previously incorporated U.S. patent application Ser. No. 13/174,615. In some embodiments the browser 126 executing on computing device 122 of the network accessible computing provider 120 collects and stores some browser access information (not shown). The network resource, portions thereof, or an image representing the network resource is then transmitted (6) to the client computing device 102. Client computing device 102 collects (7) various browser access information related to the access of the network resource. Illustratively, the browser access information collected at network accessible computing provider 120 and/or client computing device 102 can include the storage of the URL, or other network resource identifier, to a history of URLs maintained by the browser 104. The browser access information can also include user identification information or account identification information provided by content provider 110 or generated on behalf of a user/user account associated with the client computing device 102 (e.g., preference data, cookies, etc.). The browser access information can further include information associated with the presentation of content on the client computing device 102 or with the interaction with the network resource, including, but not limited to, form data, password data, downloaded images and text and the like.

With reference to FIG. 3(d), at some point after accessing the network resource and collecting the browser access information, the browser 104 obtains (8) an input from a user that is interpreted as a selection of the integrated command to remove information associated with a current network resource and access and/or display a previously accessed network resource. Responsive to the selection of the integrated command, the browser 104 removes (9), or causes to be removed, at least a subset of the browser access information collected by the browser and associated with the currently accessed network resource. Illustratively, the selection of the access information (or type of access information) that will be deleted can be made in accordance with configuration information provided by a user or system administrator. As previously described, the browser 104 can cause the removal of browser access information collected during the most recent access to the current network resource (i.e., only the access information for the most recently visited network resource). Additionally, the browser 104 can cause the deletion of browser access information collected during all previous access to the current network resource (e.g., including historical accesses to the network resource). In either situation, in some embodiments, the removal of the browser access information can make it appear as if the user never accessed the current network resource. In such an embodiment there are no electronic artifacts from the access of that network resource remaining on the client computing device 102, including any malicious software or viruses that were transmitted as part of the content associated with the current network resource. For example, malicious software could change registry settings and install programs. The integrated command can be coupled to a system restore function that causes the client computing device to revert to a prior saved known healthy state.

In addition to the deletion of the selected browser access information, the browser 104 accesses and/or displays (10) a previously accessed network resource, such as the network resource that immediately preceded the currently accessed network resource. The browser 104 may be able to access the previously accessed network resource, at least in part, with the utilization of cached information and proxy server components. As further illustrated in FIG. 3(*d*), the browser 104 transmits (11) a notification to the network accessible computing provider 120, which processes the notification to remove (12) the same set of selected browser access information maintained at the network accessible computing provider 120 (e.g., within browser 126) and requests (13) the previous network resource. In a further embodiment, receipt of the notification at the network accessible computing provider 120 can further result in the modification of the sharing of processing tasks between the browser 126 executed on the network accessible computing provider 120 and the browser 104 on the client computing device 102. For example, the browser 104 may assume that the user could have used the integrated command because they encountered an untrustworthy network resource. Accordingly, the browser 104 may enter into a "safe mode" in which the processing of all content is completed at the network accessible computing provider 120 in order to prevent any malicious processing affecting the client computing device 102. In such an embodiment, while the processing of the network resource occurs at the network accessible computing provider 120, only a display of the content may occur at the browser 104 (e.g., through a remote desktop protocol, streaming video or the like). Additionally, the client computing device 102 or a computing device 122 of the network accessible computing provider 120 can transmit (14) one or more notifications indicative of the receipt of an integrated command for specific network resources. The notification may be transmitted to the content provider 110 associated with the current network resource and/or one or more other network based service providers 118, such as a search provider or reporting service. The notifications can be sent either in real time (e.g., substantially close to the time when the integrated command was selected) or could be sent at some time after the time the integrated command was selected at the client computing device 102. In some embodiments, the notifications may be sent as a batch (e.g., once or a few times per day, among other possibilities).

Figure 4:
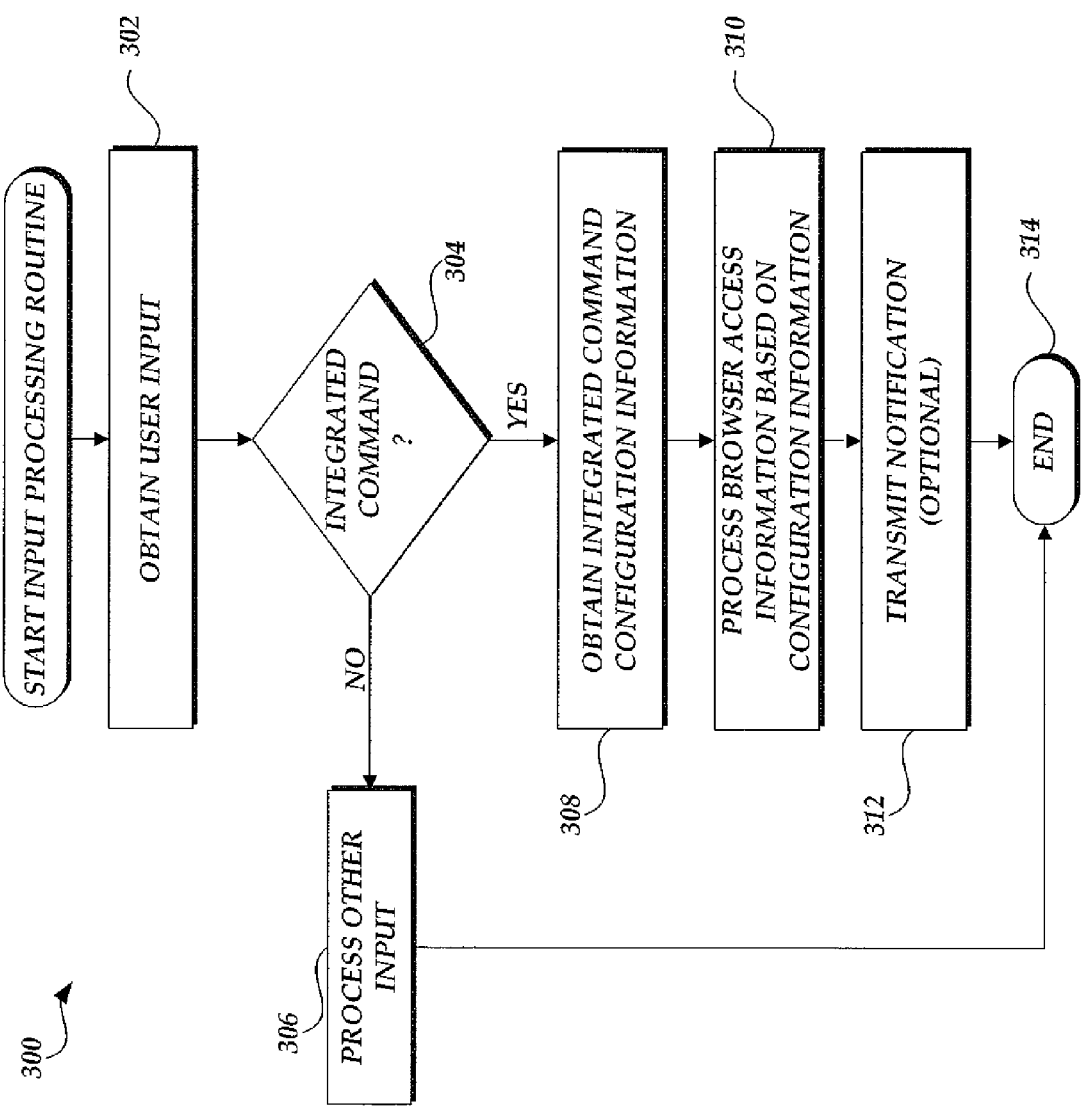
FIG. 4 is a flow diagram of an input processing routine implemented by a browser for processing integrated commands to remove information associated with a current network resource and access a previously accessed network resource.

Turning now to FIG. 4, a routine 300 for processing integrated commands to remove information associated with a current network resource and access a previously accessed network resource will be described. Illustratively, routine 300 will be described as being implemented by a browser 104 (FIG. 2(*a*)) on a client computing device 102 (FIG. 2(*a*)). However, one skilled in the relevant art will appreciate that routine 300, or portions thereof, may be implemented by one or more additional components of a content delivery environment 100 (FIG. 2(*a*)).

At block 302, the browser 104 obtains user input or indications of user input, such as via information provided to the input interface component 106. In one embodiment, the user input can correspond to a selection of a graphical icon or control provided by, or otherwise associated with, the browser 104. Example graphical icons and controls that are associated with a browser 104 will be described with regard to FIGS. 5(*a*)-5(*e*). In another embodiment, the user input can correspond to a manipulation of various touch screen interfaces. An example user interface related to touch screen interfaces will be described with regard to FIG. 5(*f*). In a further embodiment, the user input can correspond to hardware controls, such as a dedicated hardware button or customized hardware control. In yet another embodiment, the input can correspond to audio commands or video-based commands. One skilled in the relevant art will appreciate that additional or alternative inputs may also be implemented.

At decision block 304, a test is conducted to determine whether the received input corresponds to an integrated command to remove information associated with a current network resource and access a previously accessed network resource. In one embodiment, if a graphical icon is reflective solely of the integrated command to remove information associated with a current network resource and access a previously accessed network resource, a selection of the graphical icon will be indicative of selection of the integrated command. In another embodiment, if a graphical icon combines multiple controls into distinct portions, the input interface component 106 can conduct additional processing to determine whether or not the selection corresponds to a selection of an integrated command. For example, if the combined graphical icon includes multiple, distinct portions, a selection of the appropriate portion will be indicative of the selection of the integrated command. In another example, a length of time in which a combined graphical icon is selected through a user interface, such as through a mouse interface or touch screen interface, can be indicative of the selection of the integrated command. In this example, the input interface component 106 (FIG. 2(*a*)) may establish one or more time and location thresholds that are applied to determine whether the length of time an icon is selected is indicative of a selection of the integrated command.

In a further embodiment, the input interface component 106 may utilize additional data processing techniques such as voice data processing, pattern matching, video matching and the like to determine whether received user input is indicative of a selection of the integrated command. For example, the input interface component 106 can have video pattern processing functionality that can detect user movements and attempt to match the detected movements to a predetermined pattern indicative of a selection of the integrated command. In yet another embodiment, the input interface component 106 may establish one or more timing thresholds or implement various pattern matching routines that process inputs from a touch screen interface. For example, the input interface component 106 may have a time and location threshold that is applied to determine whether a consistent touching of the screen (e.g., holding a stylus or finger on the touch screen interface for more than 2 seconds) is indicative of a selection of the integrated command.

If at decision block 304, the input is not indicative of a selection of an integrated command to remove access information associated with a current network resource and access a previously accessed network resource, at block 306, the browser 104 processes the other input. For example, the input may correspond only to a selection of a "back button" in which the browser 104 would access a previously accessed network resource without causing the selective deletion of the browser access information. One skilled in the relevant art will appreciate that type and processing of other input can vary with specific implementations of the browser 104. The routine 300 then terminates at block 314.

Alternatively, if at decision block 304, the input is indicative of a selection of control or icon corresponding to an integrated command, at block 308, the browser 104 obtains configuration information associated with the integrated command. Specifically, in one embodiment, the configuration information can include a specification of the type of browser access information that should be deleted or otherwise removed. For example, a user may configure the browser to delete all collected browser access information. In another example, the user may configure the browser to delete the entry in the URL history and any stored personal information, but allow cached images and text to remain behind. In some embodiments, the browser 104 may be configured with default settings, which may or may not be capable of adjustment by a user or system administrator.

At block 310, the browser 104, through the information management component 108 (FIG. 2(a)), processes the browser access information in accordance with the configuration information. In one aspect, the deletion or removal of the browser access information can correspond to deletion of one or more URLs in a history of accessed network resources, identifiers associated with the network resources (e.g., cookies), form data, password data, cached images or data and the like. In another aspect, at least a portion of the browser access information may be maintained for information that may be associated with multiple previously accessed network resources (e.g., a company logo) or that otherwise have been selected to avoid deletion. For example, a content provider 110 can associate meta-data with select content, such as images, text or data that identifies the selected content as content that should persist regardless of a received integrated command. As previously described, the information management component 108 can cause the deletion of browser access information collected only during the most recent access to the current network resource. Additionally, the browser 104 can cause the deletion of browser access information collected during all previous accesses to the current network resource or during a particular browsing session.

At block 312, the browser 104, through the interface component 106, transmits any optional notifications or notices. As previously described, the client computing device 102, either directly or via the network accessible computing provider 120, can transmit one or more notifications indicative of the receipt of an integrated command for specific network resources. The notification may be transmitted to the content provider 110 associated with the current network resource or one or more network based service providers 118 (FIG. 2(a)), such as a search provider, reporting service or network accessible computing provider 120 (FIG. 3(a)). Additionally, steps can be taken at this point in the process, or earlier, to request a previously accessed network resource or some other specified network resource (not shown). At block 314, the routine 300 terminates.

Figure 5A:
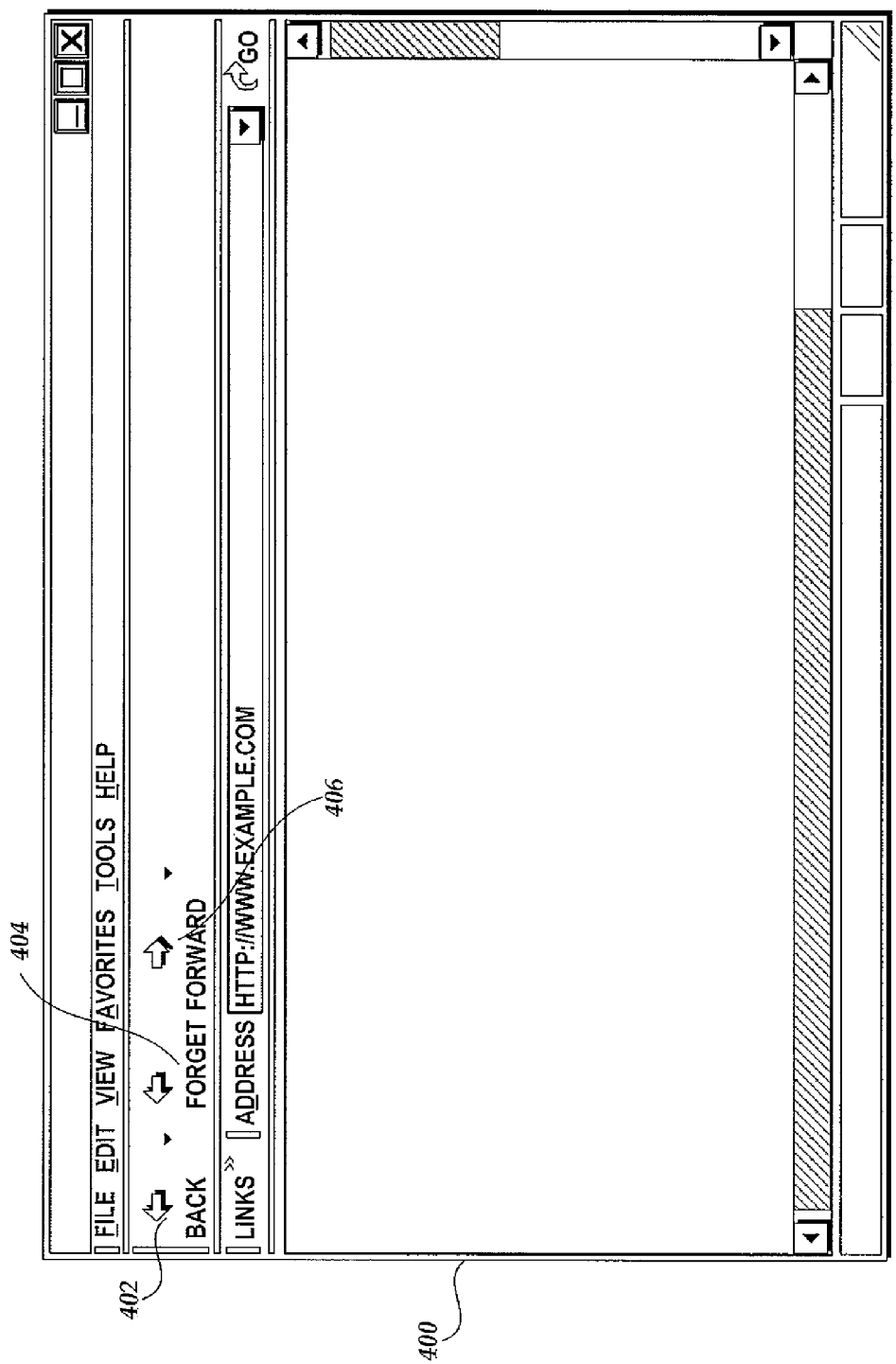
FIGS. 5(a)-5(f) are diagrams illustrative of various user interfaces generated by a browser for presenting one or more controls corresponding to an integrated command to remove information associated with a current network resource and access a previously accessed network resource.

FIGS. 5(a)-5(f) are block diagrams illustrative of various user interfaces generated by a browser 104 for presenting, among other controls, one or more graphical icons or controls corresponding to an integrated command to remove information associated with a current network resource and access a previously accessed network resource. With reference to FIG. 5(a), in one embodiment, a user interface 400 generated by a browser 104 displays a set of selectable controls (e.g., buttons) that are presented to users as they access a network resource. The set of controls can include a first control 402 reflective of a command to access a previously accessed network resource without deleting any browser access information (e.g., a conventional "back button"). The set of controls also include a second, separate control 404, labeled "FORGET," reflective of an integrated command to remove information associated with a current network resource and to access a previously accessed network resource. The user interface 400 can also include an additional control 406, such as a conventional forward button, for additional navigation control to access a network resource in the forward direction. As illustrated in FIG. 5(a), the controls 402, 404 and 406 include both graphics and text to indicate to a user the intended configuration of the respective control.

Figure 5B:
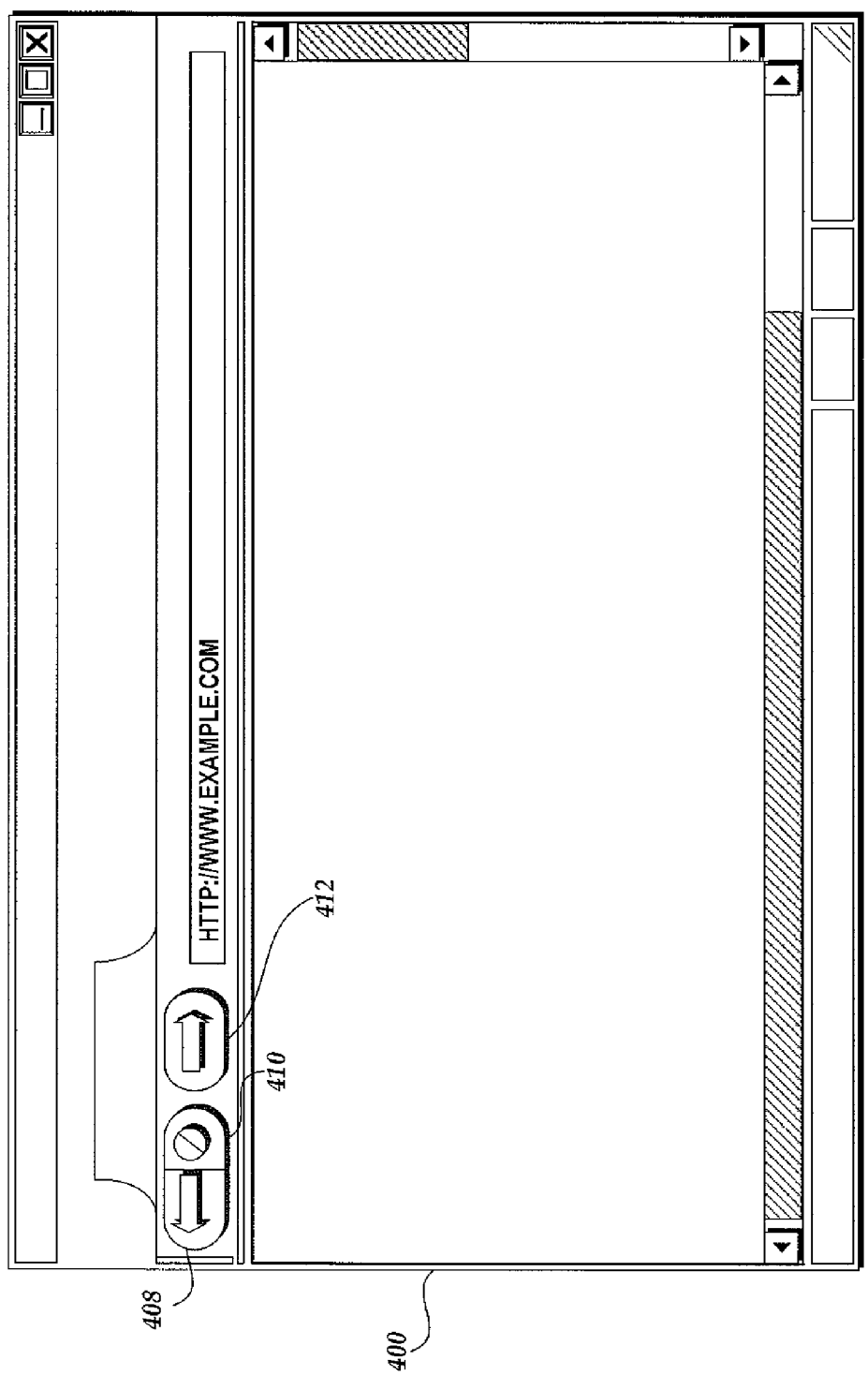

With reference to FIG. 5(b), in another embodiment, the user interface 400 generated by a browser 104 displays a set of controls that are presented to users as they access a network resource. The set of controls include a first control 408 reflective of a command to access a previously accessed network resource without deleting any browser access information. The controls also include a second control 410 reflective of an integrated command to remove information associated with a current network resource and to access a previously accessed network resource. As illustrated in FIG. 5(b), the first and second controls 408, 410 are more closely combined and can be encompassed into a single, multi-part control. The user interface 400 can also include an additional control 412, such as a conventional forward button, for additional navigation control to access a network resource in the forward direction. As illustrated in FIG. 5(b), the controls 408, 410 and 412 include only graphics to indicate to a user the intended configuration of the respective control.

Figure 5C:
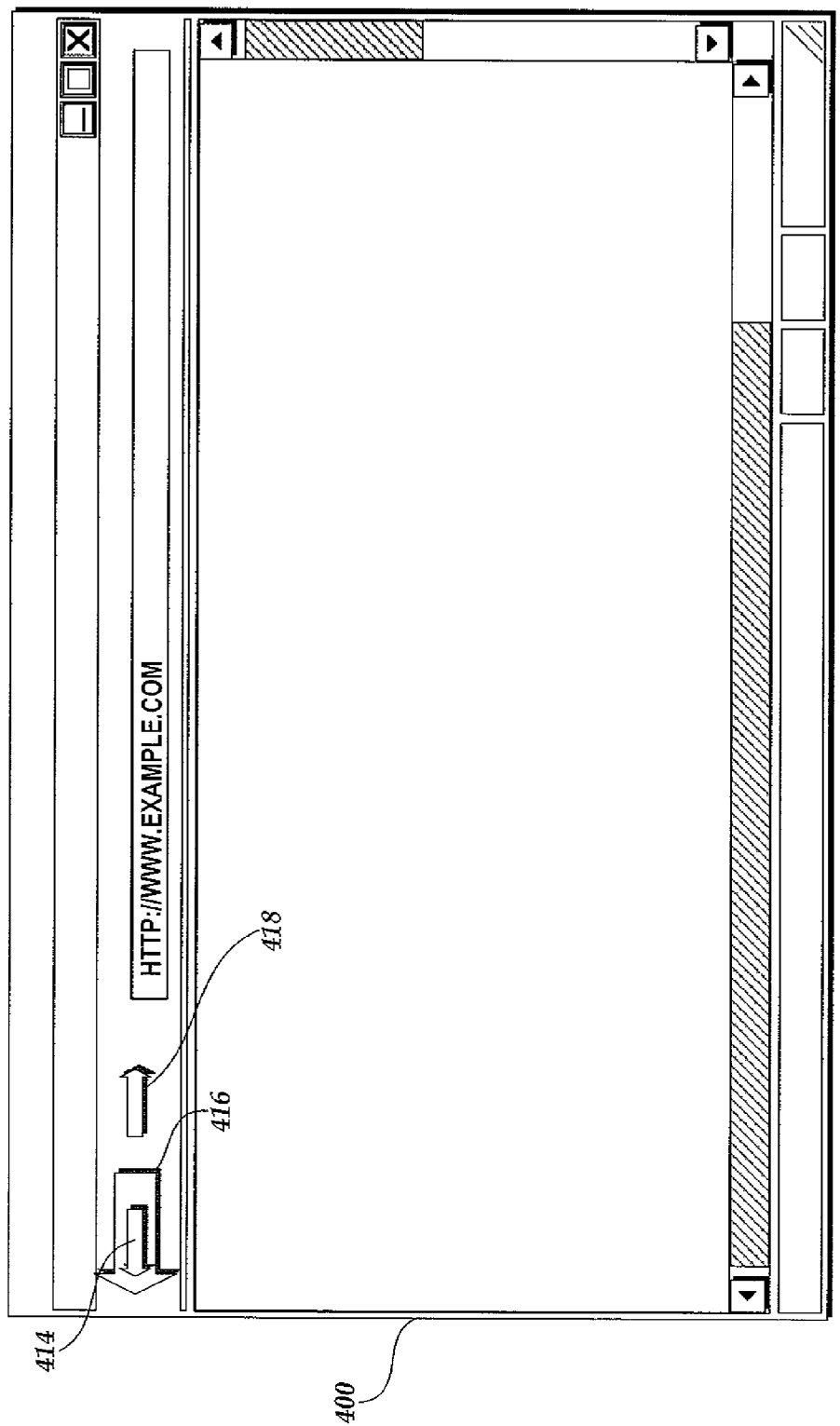
Figure 5D:
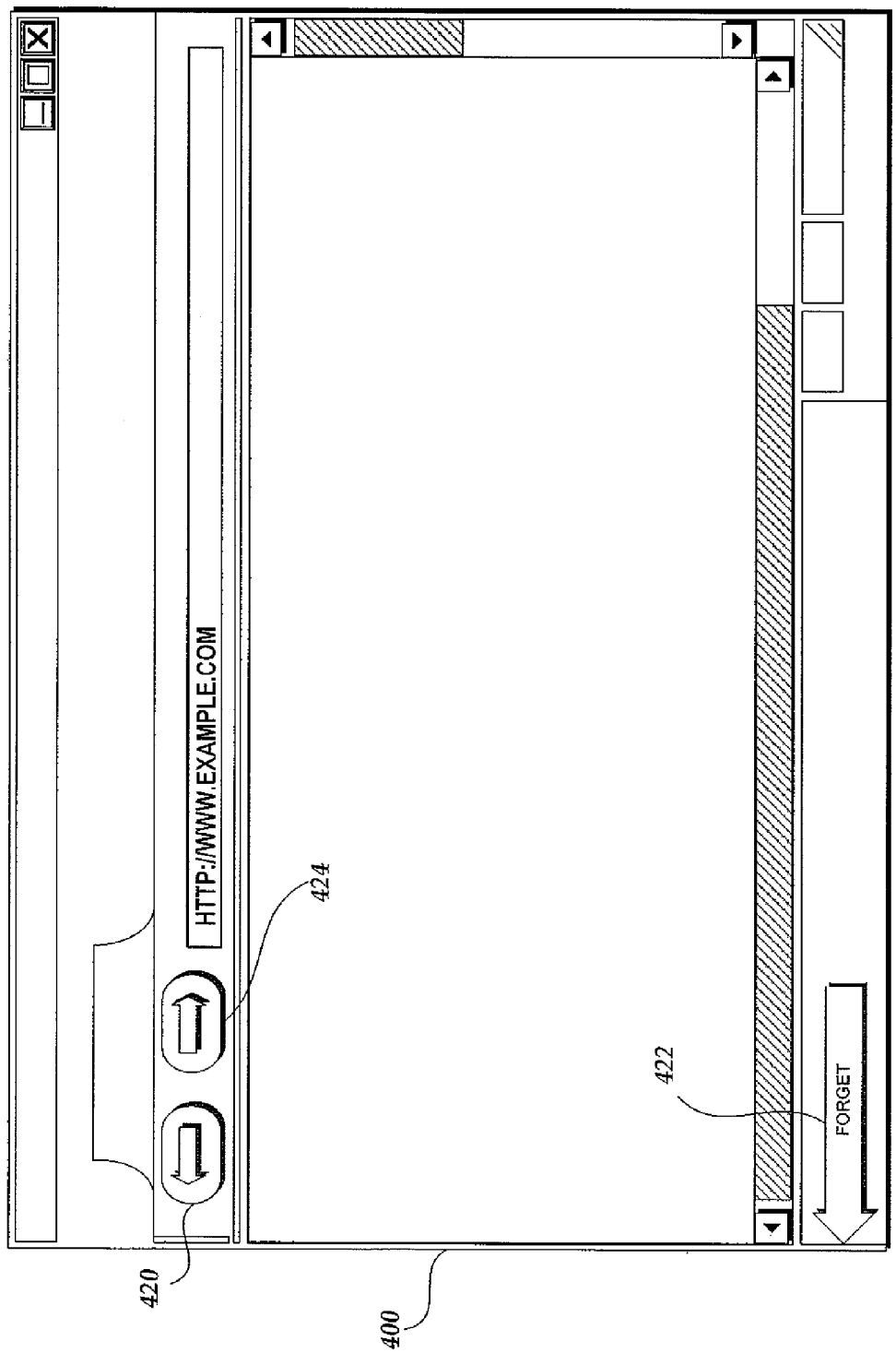
Figure 5E:
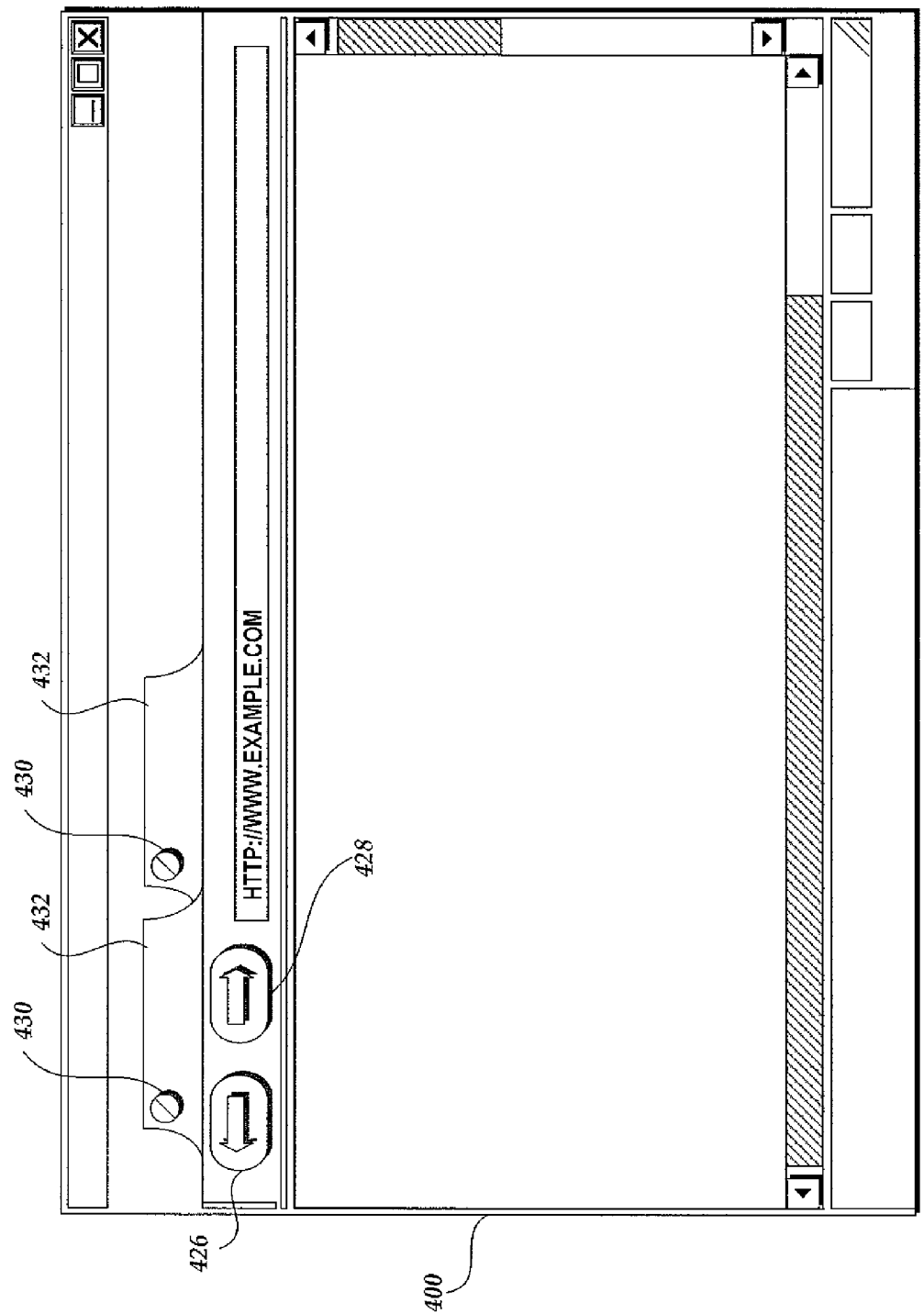
Figure 5F:
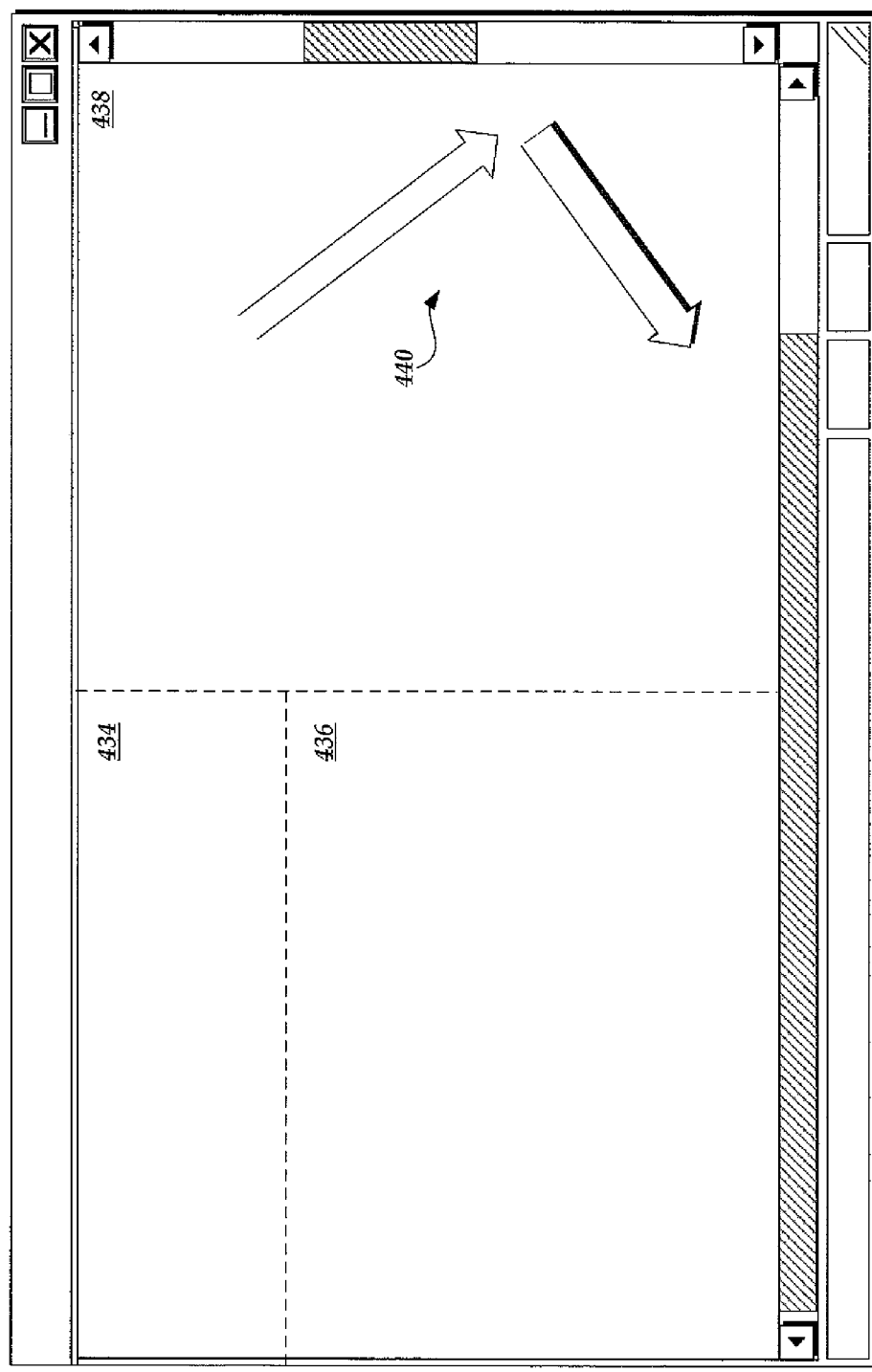

With reference to FIG. 5(c), in another embodiment, the user interface 400 generated by a browser 104 displays a set of controls that are presented to users as they access a network resource. The set of controls include a first control 414 reflective of a command to access a previously accessed network resource without deleting any browser access information. The controls also include a second control 416 reflective of an integrated command to remove information associated with a current network resource and to access a previously accessed network resource. Unlike the examples in FIGS. 5(a) and 5(b), in this embodiment, the first control 414 is superimposed over the second control 416. In this embodiment, the input interface component 106 may determine whether the first control or second control has been selected according to the specific location selected by a user. Additionally, or alternatively, the input interface component 106 may determine whether the first control or second control has been selected according to a time that any portion of the combined graphical icon is selected. The user interface 400 can also include an additional control 418, such as a forward button, for additional navigation control. As illustrated in FIG. 5(c), the controls 414, 416 and 418 include only graphics, without associated text, to indicate to a user the intended configuration of the respective control.

With reference to FIG. 5(*d*), in a further embodiment, the user interface 400 generated by a browser 104 displays a set of controls that are presented to users as they access a network resource. The set of controls include a first control 420 reflective of a command to access a previously accessed network resource without deleting any browser access information. The controls also include a second control 422 reflective of an integrated command to remove information associated with a current network resource and to access a previously accessed network resource. Unlike the examples in FIGS. 5(*a*)-5(*c*), in this embodiment, the second control 422 is located in a different location on the user interface 400. The user interface 400 can also include an additional control 424, such as a forward button, for additional navigation control. As illustrated in FIG. 5(*d*), controls 420 and 424 include only graphics, without associated text, to indicate to a user the intended configuration of the respective control. Control 422 includes both graphics and associated text.

With reference to FIG. 5(*e*), in a further embodiment, the user interface 400 generated by a browser 104 displays a set of controls that are presented to users as they access a network resource. The set of controls include a first control 426 reflective of a command to access a previously accessed network resource without deleting any browser access information and an additional control 428 for additional navigation control. The controls also include a third control 430 reflective of an integrated command to remove information associated with a current network resource and to access a previously accessed network resource. Unlike the examples in FIGS. 5(*a*)-5(*c*), in this embodiment, the additional control 430 is located in a different location on the user interface 400 and associated with particular tabs 432 of the screen display. As illustrated in FIG. 5(*e*), the additional control 430 is displayed on each tab 432 that is generated by the browser 104. Additionally, controls 426-430 include only graphics to indicate to a user the intended configuration of the respective control. In some embodiments the control 430 can be configured to remove access information associated with all network resources accessed while the user browsed within the associated tab 432 rather than removing the access information associated with only the currently accessed network resource. In such an embodiment, responsive to the access information being removed, the tab 432 may be closed and the browser then displays the network resource of a second tab, or a new tab may be opened and a predetermined network resource (e.g., a user's home page) is displayed. Similar to embodiments in which the control 430 removes access information associated with all network resources accessed while the user browsed within the associated tab, the browser can be configured with an integrated command to close (e.g., exit) the browser application and remove access information associated with all network resources accessed while the user browsed within any tabs while the browser application was open. Such a command could be surfaced to the user within a menu option or a graphical icon in the framework of the browser similar to control 430.

With reference to FIG. 5(*f*), in an embodiment in which some portion of the user interface 400 may correspond to a touch interface, the browser 104 may utilize physical touch gestures or movements to obtain input indicative of a selection of the integrated command. As illustrated in FIG. 5(*f*), the user interface 400 does not necessarily have any graphical icons or controls that are displayed to users as they access a network resource, such as the controls illustrated in FIGS. 5(*a*)-5(*e*). In alternative embodiments, however, one or more controls may be provided or displayed in conjunction with this embodiment. For example, a housing of the client computing device could include a physical button (not shown) and/or a control could be displayed by the touch interface (not shown) to allow the user to initiate the integrated command (e.g., activate the integrated command by pushing a button or clicking on an icon). For purposes of an illustrative embodiment, the user interface 400 can be divided into a number of subareas 434, 436 and 438 in which input from a touch may correspond to different commands. For example, subarea 434 may be configured such that any touch lasting over five seconds may correspond to a command to access a previously accessed network resource without deleting any browser access information. Subarea 436 may be configured such that any touch/input lasting over ten seconds may correspond to an integrated command to remove information associated with a current network resource and to access a previously accessed network resource. In a further embodiment, subarea 438 can also configured to accept user gestures or patterns (as illustrated at 440) that can be interpreted by the input interface component 106 as indicative of one or more commands, such as the integrated command.

In an illustrative embodiment, a network based service provider 118, such as search provider or rating service, may monitor the number of times a particular network resource has been the subject of an integrated command. Based on the number of integrated commands (cumulatively over a number of users) or a severity associated with a particular integrated command (assuming some type of metadata or feedback mechanism is provided), the network resources can implement various mitigation or notification techniques. In one embodiment, the network based service provider 118 can define one or more thresholds based on a number of integrated commands for determining whether to initiate additional actions or mitigation techniques. In one example, the network based service provider 118 can establish a maximum threshold that, when exceeded, causes the network based service provider 118 to contact a respective content provider 110. In another example, the network based service provider can modify the appearance of URLs or other network identifiers that allow the network based service provider 118 to identify network resources that are more commonly subject to an integrated command. For example, if a total of twenty-thousand users have viewed a particular network resource and ten-thousand of those users used the integrated command after accessing it, the network service provider may change the color of the URL to a more prominent color (e.g. red, orange, neon, etc.). In still another example, if a particular network based service provider 118 has financial dealings with various content providers 110, the network based service provider 118 can initiate the modification of financial compensation paid to one or more content providers 110 based on the number integrated commands or severity associated with one or more integrated commands.

Figure 6:
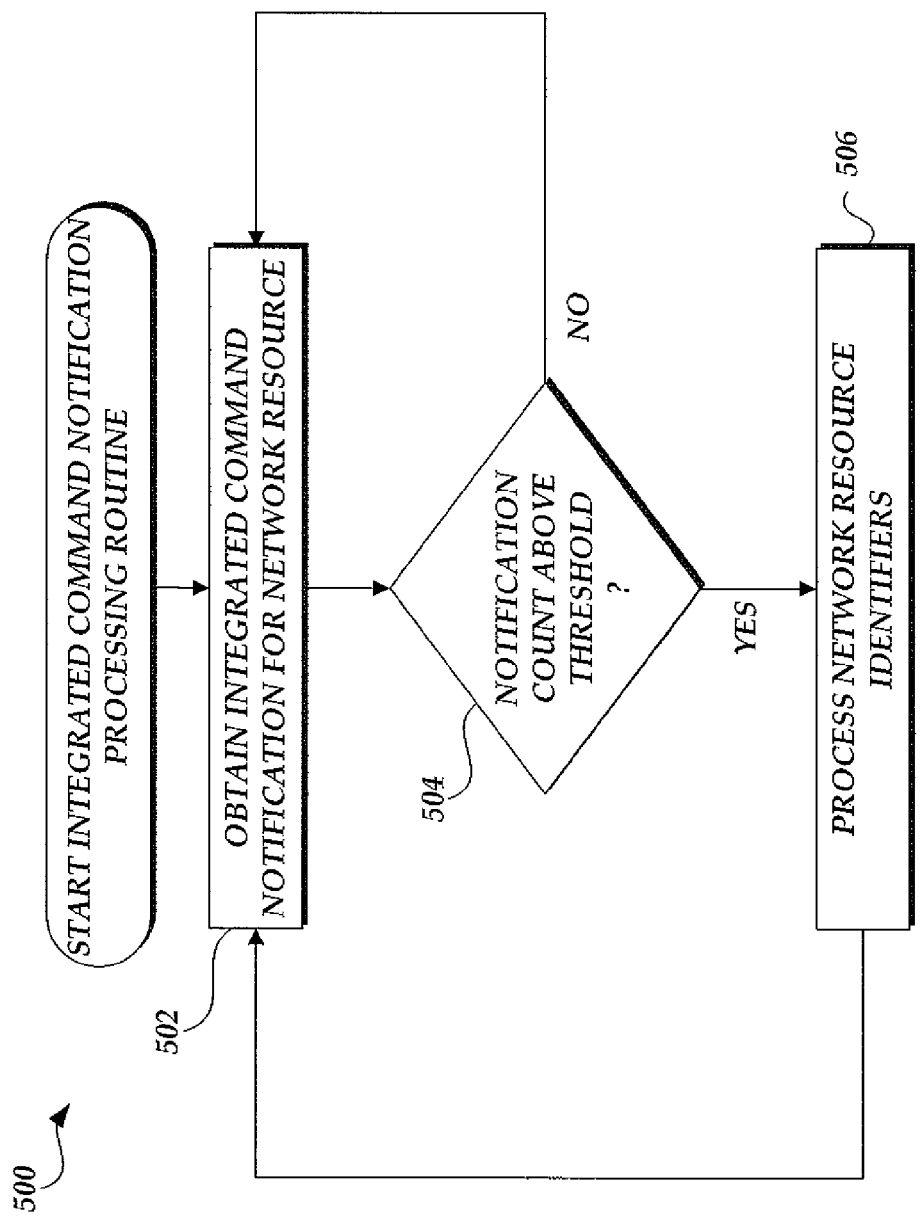
FIG. 6 is a flow diagram illustrative of an integrated command processing routine implemented by a network resource for processing notifications of the selection of an integrated command to remove information associated with a current network resource and access a previously accessed network resource.

Turning now to FIG. 6, an integrated command processing routine 500 implemented by a network based service provider 118 for processing notifications of the selection of an integrated command to remove information associated with a current network resource and access a previously accessed network resource will be described. Routine 500 describes an embodiment in which a network based service provider 118 implements various thresholds as to a number of allowable notifications that can result in the modification of how network identifiers are subsequently presented to users.

At block 502, the network based service provider 118 obtains a notification of the initiation of an integrated command to remove information associated with a current network resource and to access a previously accessed network resource. The notification may be transmitted by a browser 104 or network accessible computing provider 120, as previously described. Illustratively, the notification can include an identification of the network resource identifier (e.g., URL) that was subject the integrated command. Additionally, the notification can include additional information about the browser application 104 or user, including additional comments or explanations provided by the user.

At decision block 504, a test is conducted to determine whether notification for a particular network resource has exceeded one or more thresholds. In one embodiment, the one or more thresholds can correspond to a total number of received integrated commands over a defined period of time. In another embodiment, the one or more thresholds can correspond to a maximum severity rating that cannot be exceeded. If one or more thresholds have not been exceeded, the routine 500 returns to block 502 to await any potential notifications from a browser.

Alternatively, if the one or more thresholds have been exceeded, at block 506, the network based service provider 118 processes one or more network resource identifiers based on the exceeded threshold. In one embodiment, the network based service provider 118 can modify the appearance of URLs or other network identifiers associated with specific network resources, such as via instructions provided to content providers 110 or browsers 104. An illustrative screen display for the modification of the appearance of network resource identifiers is described with regard to FIG. 7. In other embodiments, the modification of the resource identifiers can correspond to the alternation of the appearance of the resource identifier when displayed as part of the retrieved network resource, such as font color, size and the like. In further embodiments, the network based service provider can cause a modification of various algorithms or criteria that may affect the selection of specific network resources or cause or instruct various content providers 110 to do so. For example, the network based service provider 118 may cause the selection of the network identifier to present a warning message (e.g., "A large number of users have removed access information about this network resource from their browsing history. Are you sure you want to select this link?"). In still another embodiment, the network based service provider 118 can cause or instruct various content providers 110 to remove one or more identifiers corresponding to specific network resources. The routine 500 returns to block 502 to await any potential notifications from browsers.

Figure 7:
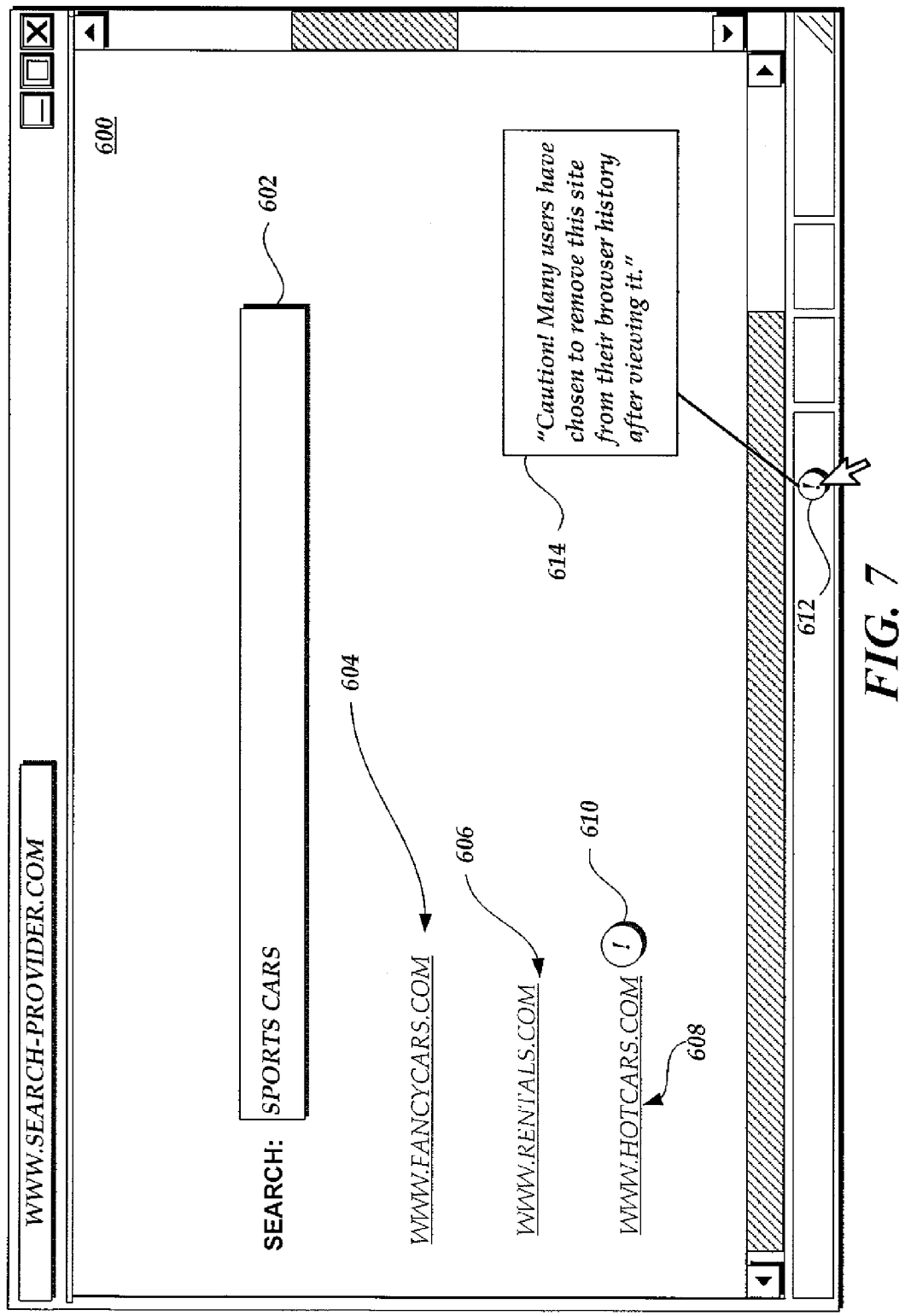
FIG. 7 is a diagram illustrative of a user interface generated by a browser for presenting identifiers indicative of network resources that have been subject to the selection of an integrated command to remove information associated with a current network resource and access a previously accessed network resource.

FIG. 7 illustrates a user interface 600 generated by a browser 104 for presenting identifiers indicative of network resources that have been subject to the selection of an integrated command to remove information associated with a current network resource and access a previously accessed network resource. Specifically, the user interface 600 corresponds to search results provided by network based service provider 118, such as a search provider, that has received a search query from a client computing device 102. As illustrated in FIG. 7, the user interface 600 includes a first portion 602 that corresponds to the search query submitted to the search provider. Additionally, the user interface 600 includes a listing of three network resources 604, 606 and 608 determined by the search provider to have some relevance to the search query. Additionally, search listing 608 is also associated with a graphical icon 610 that provides a user with additional information, such as a caution, that the network resource corresponding to the network resource identifiers has been associated with a threshold number of integrated commands. In some embodiments this threshold could also reflect a percentage of occurrences that users have accessed the network resource without using the integrated command with respect to the number of occurrences that users have used the integrated command. Graphical icon 610 could also inform the user that he or she had previously used the integrated command with respect to that specific network resource, although this requires retaining some history information with respect to that user's access of that network resource. In an additional or alternative embodiment the caution may be presented to the user within the browser itself as opposed to being overlaid in the displayed content. For example, the caution may be displayed with a graphical icon 612 within the browser framework such as the notification tray. When a user hovers over or selects the graphical icon 612 a text box 614 can be surfaced to display a warning such as "Caution! Many users have chosen to remove this site from their browser history after viewing it" or "Caution! You previously removed this site from your browser history after viewing it."

According to another embodiment a search provider can implement functionality to completely remove the network resource identifier from the search results when a user uses the integrated command. For example, if a user is provider with search results shown in FIG. 7 and selects the network identifier 604 ("www.fancycars.com"), the browser 104 then accesses and displays the network resource located at www.fancycars.com. According to such an embodiment, if the user then selects the integrated command, browser 104 notifies the search provider of this action. The search provider then interprets this action as an indication by the user that they are not interested in the information associated with this network resource subject to the integrated command. When the browser 104 accesses the previously displayed search results (as part of the integrated command) the search provider removes the network resource subject to the integrated command and displays the remaining search results. Accordingly, the search results would appear as shown in FIG. 7 except that the www.fancycars.com URL is not displayed. Thus, the search provider uses the notification of the integrated command to further remove the network resource identifier completely from view of the user in any search results or, in some embodiments, for search results for the particular keyword used.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the client computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computing device configured to manage information associated with web pages comprising:
    one or more processors; and
    one or more computer-readable media storing computer-executable instructions that,
    when executed, cause one or more processors to perform acts comprising:
        receiving a command to display a previously accessed web page on the computing device and to remove access information associated with a currently accessed web page from the computing device, wherein the previously accessed web page was previously accessed from a network-accessible content server; and
        responsive to receiving the command:
            causing the removal of the access information associated with the currently accessed web page from the computing device such that the computing device removes a record that the currently accessed web page was accessed, wherein access information indicating that the previously accessed web page was accessed is preserved;
            causing the display of the previously accessed web page; and
            transmitting a notification to the network-accessible content server reporting an indication of the receipt of the command and an identification of the currently accessed web page.

2. The computing device as recited in claim 1, wherein the executable instructions, when executed, cause the one or more processors to receive a navigation command to cause display of a previously accessed web page without removal of access information associated with the currently accessed web page.

3. The computing device as recited in claim 1, wherein the removal of the access information includes the removal of: one or more network resource identifiers associated with the currently accessed web page from a software application history, user identification associated with the currently accessed web page, and content previously requested in accessing the currently accessed web page.

4. A computer-implemented method for managing information associated with network resources comprising:
    under control of one or more processors configured with specific executable instructions,
        determining whether a single input corresponds to a command to (i) remove access information associated with the access of a first network resource and (ii) display a second network resource previously received from a network-accessible content server; and
        responsive to determining that the single input corresponds to the command to remove the access information and display the second network resource:
            causing the display of the second network resource;
            causing removal of access information indicating that the first network resource was accessed, wherein access information indicating that a separate network resource was accessed is preserved; and
            causing transmission of a notification regarding the first network resource to the network-accessible content server.

5. The computer-implemented method of claim 4, wherein the first network resource is a currently accessed network resource and the second network resource is a network resource that is identified, in a network resource access history, as being displayed immediately before the currently accessed network resource.

6. The computer-implemented method of claim 5, further comprising:
    determining whether at least one additional input corresponds to a command to navigate to the network resource that is identified, in a network resource access history, as being displayed immediately before the currently accessed network resource without deleting information associated with the currently accessed network resource.

7. The computer-implemented method of claim 4, wherein the first network resource is a currently accessed network resource and the second network resource is a network resource that is identified, in a network resource access history, as being displayed immediately after the currently accessed network resource.

8. The computer-implemented method of claim 7, further comprising:
    determining whether at least one additional input corresponds to a command to navigate to the network resource that is identified, in a network resource access history, as being displayed immediately after the currently accessed network resource without deleting information associated with the currently accessed network resource.

9. The computer-implemented method of claim 4, wherein the single input corresponds to a single, integrated action to perform both the causing the display of the second network resource and causing removal of access information indicating that the first network resource was accessed.

10. The computer-implemented method of claim 4, wherein causing removal of access information indicating that the first network resource was accessed includes causing removal from a software application history of at least one of:
- a network resource identifier of the first network resource;
- account identifiers associated with the first network resource;
- user identifiers associated with the first network resource; and
- content associated with the first network resource identifier.

11. The computer-implemented method of claim 10, wherein the content associated with the first network resource identifier includes at least one of form information, password information, images and text.

12. The computer-implemented method of claim 4, wherein causing removal of access information indicating that the first network resource was accessed includes:
- obtaining configuration information, the configuration information identifying information that will be removed in response to the single input; and
- causing removal of the access information in accordance with the configuration information.

13. The computer-implemented method of claim 4, wherein the single input corresponds to at least one of a selection of a control button, a selection of a touch interface, a selection of a hardware control and a voice command.

14. The computer-implemented method of claim 4, wherein determining whether the single input corresponds to the command to remove access information and display a second network resource includes determining an amount of time a touch interface has been accessed.

15. The computer-implemented method of claim 4, wherein determining whether the single input corresponds to the command to remove access information and display a second network resource includes determining whether a pattern associated with a touch interface substantially matches a previously determined pattern.

16. Non-transitory computer-readable storage storing computer-readable instructions that, when executed, instruct a processor to perform a method comprising:
- rendering, for display on a computing device, a first selectable component for displaying a first network resource and modifying information associated with a second network resource; and
- responsive to an input corresponding to a selection of the first selectable component:
  - causing the processing of the display of the first network resource;
  - causing information associated with the second network resource to be modified, wherein information associated with a separate network resource is preserved; and
  - causing transmission of a notification regarding the second network resource to a network-accessible content server.

17. The non-transitory computer-readable instructions of claim 16, wherein the first selectable component is operative solely to initiate a command to display the first network resource and modify information associated with the second network resource.

18. The non-transitory computer-readable instructions of claim 16, wherein the first selectable component is operative to initiate a command to display the first network resource, modify information associated with the second network resource and at least one additional command.

19. The non-transitory computer-readable instructions of claim 16, wherein causing information associated with the second network resource to be modified includes modification of the information to remove information indicating that the computing device accessed the second network resource.

20. The non-transitory computer-readable instructions of claim 16, wherein causing information associated with the second network resource to be modified includes at least one of:
- deleting the information;
- encrypting the information; and
- obfuscating the information.

21. The non-transitory computer-readable storage of claim 16, wherein the first network resource is a previously accessed network resource and the second network resource is a currently accessed network resource.

22. The non-transitory computer-readable storage of claim 16, wherein the first network resource is a predefined network resource and the second network resource is a currently accessed network resource.

23. The non-transitory computer-readable storage of claim 16, further comprising instructions for:
- rendering, for display on the computing device, a second selectable component for displaying the first network resource without removing the information associated with the second network resource; and
- responsive to an input corresponding to a selection of the second selectable component, causing the processing of the display of the first network resource without deleting the information associated with the second network resource.

24. The non-transitory computer-readable storage of claim 16, wherein causing information associated with the second network resource to be modified includes causing removal of access information from the computing device and a content provider that provided the second network resource to the computing device.

25. The non-transitory computer-readable storage media of claim 16, wherein causing transmission of the notification regarding the second network source to a network-accessible content server comprises causing transmission of the notification to at least one of:
- a server associated with the first network resource;
- a server associated with the second network resource;
- a server associated with a reporting service; and
- a server associated with a search service.

26. A computer-implemented method for managing information associated with network resources comprising:
- under control of a network based service provider comprising one or more physical computing devices configured to execute specific instructions,
  - receiving, at the network based service provider, a notification from a computing device that a single input has been selected corresponding to a command to (i) remove access information associated with the access of a first network resource by the computing device, and (ii) display a second network resource previously provided to the computing device by the network based service provider, the notification including an identification of the first network resource; and
  - responsive to receiving the notification, storing a record of the notification along with the identification of the first network resource.

27. The computer-implemented method of claim 26, further comprising:

determining whether a quantity of notifications received by the network based service provider has at least reached a threshold; and responsive to the quantity of notifications reaching at least a threshold, initiating an action by the network based service provider.

28. The computer-implemented method of claim 27, wherein initiating an action by the network based service provider includes at least one of:

notifying a content provider of the first network resource that the quantity of notifications received by the network based service provider has at least reached the threshold; and causing the display of an indication on the computing device that the quantity of notifications received by the network based service provider has reached the threshold.

29. The computer-implemented method of claim 26, further comprising:

causing the removal of access information associated with the access of the first network resource from the network based resource provider.

30. The computer-implemented method of claim 26, wherein network resource based service provider is at least one of:

a content provider associated with the first network resource;

a network accessible computing provider;

a network resource associated with a reporting service; and a network resource associated with a search service.

31. The computer-implemented method of claim 26, wherein the network resource based service provider is a network accessible computing provider that executes at least a portion of a browser application in combination with a second browser application on the computing device to display the first and second network resources.

* * * * *